United States Patent
Toyoda

(10) Patent No.: US 6,381,376 B1
(45) Date of Patent: Apr. 30, 2002

(54) RESTORING A SINGLE IMAGE BY CONNECTING A PLURALITY OF CHARACTER, SHADOW OR PICTURE INPUT IMAGES

(75) Inventor: Masanori Toyoda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/346,858

(22) Filed: Jul. 2, 1999

(30) Foreign Application Priority Data

Jul. 3, 1998 (JP) .......................................... 10-189506

(51) Int. Cl.[7] ................................................ G06K 9/36
(52) U.S. Cl. ...................... 382/284; 382/294; 382/224; 358/450
(58) Field of Search ................................ 382/173, 176, 382/181, 190, 199, 203, 209, 216, 217, 218, 284, 294, 224, 225; 345/629, 634, 636; 358/449, 450, 462, 464

(56) References Cited

U.S. PATENT DOCUMENTS 5,465,163 A    11/1995  Yoshihara et al. .......... 358/444
6,002,492 A  * 12/1999  Kamon et al. .............. 358/450
6,148,118 A  * 11/2000  Murakami et al. .......... 382/284
6,259,826 B1 *  7/2001  Pollard et al. ............. 382/284

* cited by examiner

*Primary Examiner*—Bhavesh Mehta
(74) *Attorney, Agent, or Firm*—Dike, Bronstein, Roberts & Cushman; David G. Conlin

(57) ABSTRACT

An image processing device includes an intermediate processing section for appending identification data to each pixel, showing a kind of region to which each pixel belongs, based on multi-value image data of a plurality of input images entered from a scanner, and a matching data generating section for generating matching data of each pixel. A CPU classifies the kind of region to which each input image belongs based on the identification data of each pixel stored into an identification data memory by means of a connection processing section, and compares the matching data stored in a matching data memory after processed adequately depending on the kind of region. Then, the CPU extracts matching points of the input images and connects the binary image data of the input images using the extracted matching points as reference points. Consequently, a plurality of input images can be restored to a single image by being connected accurately whether the input images are picture, shadow, or picture images.

10 Claims, 18 Drawing Sheets

OVERLAPPING IMAGE AREA

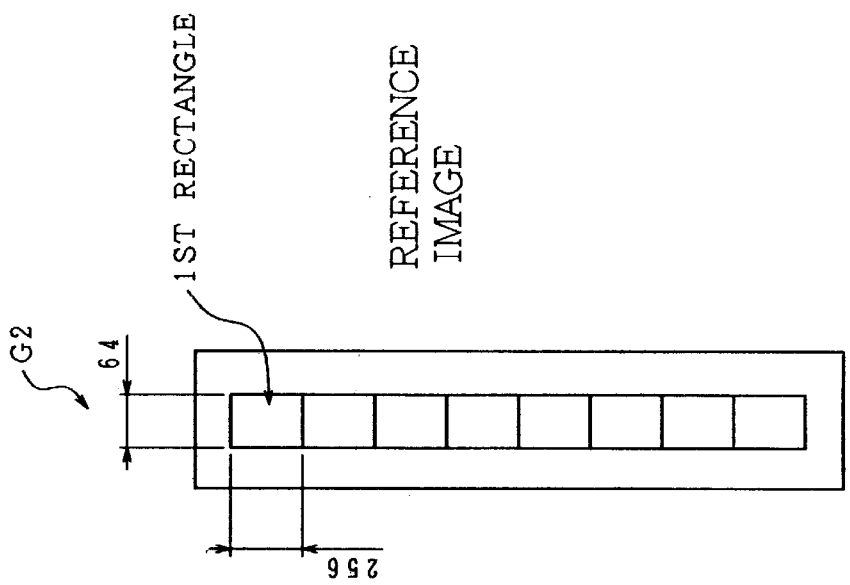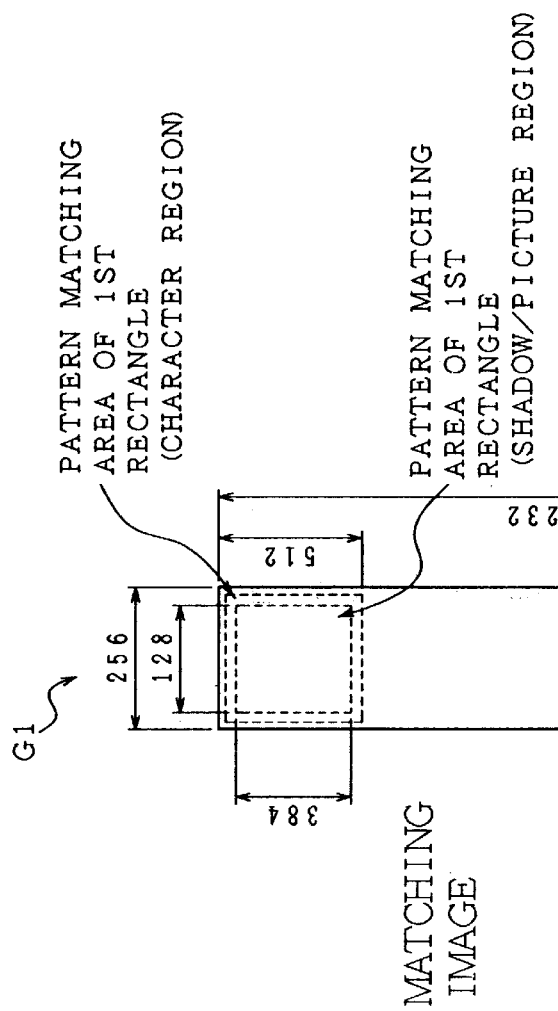

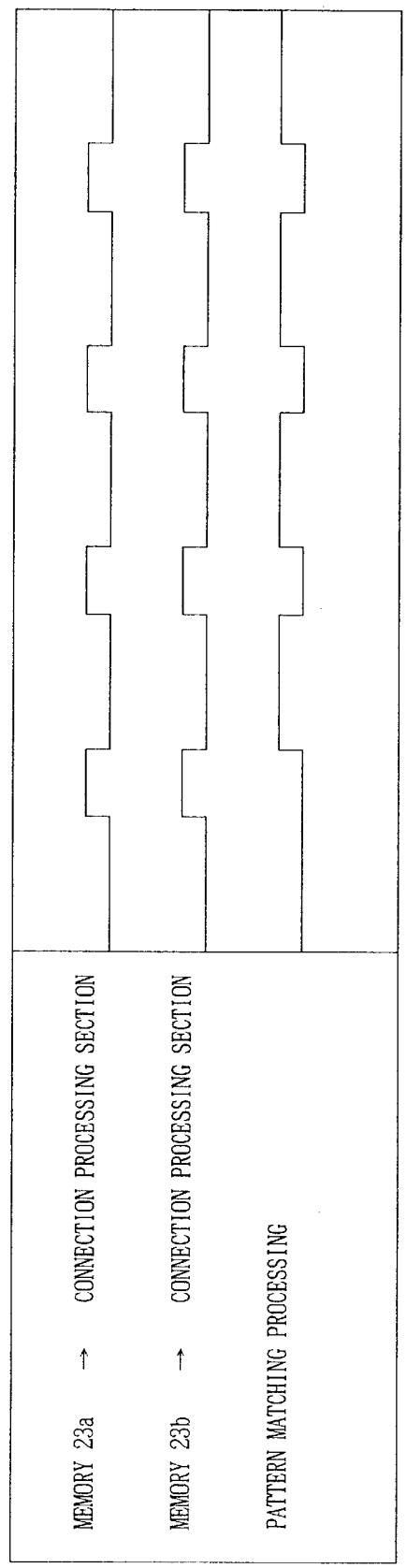

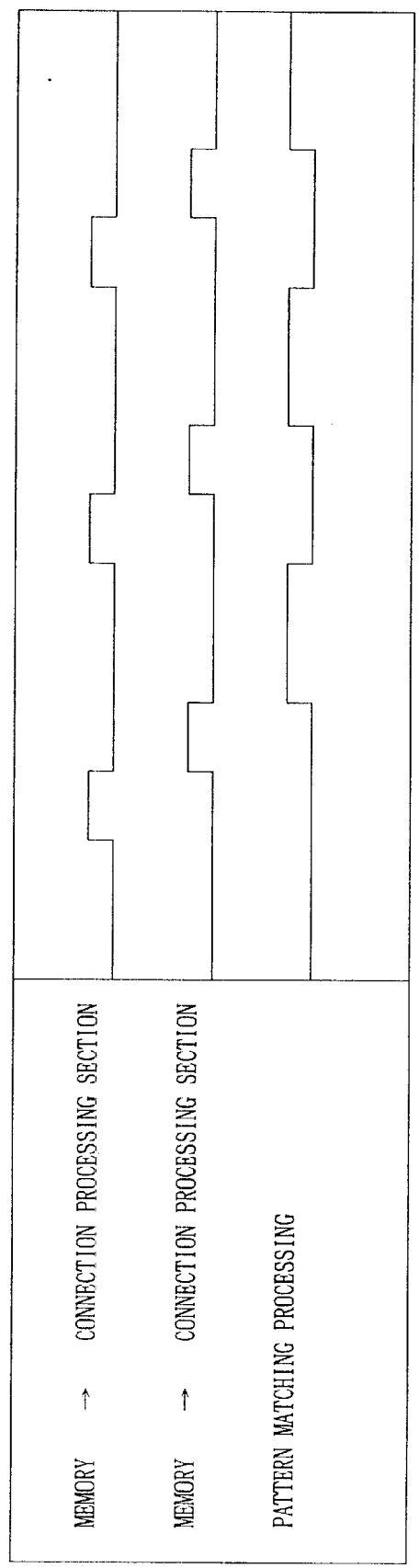

RESTORING A SINGLE IMAGE BY CONNECTING A PLURALITY OF CHARACTER, SHADOW OR PICTURE INPUT IMAGES

FIELD OF THE INVENTION

The present invention relates to an image processing device which outputs a plurality of input images as a single image by connecting the input images in such a manner as to overlap partially.

BACKGROUND OF THE INVENTION

One type of conventional image forming apparatuses, such as a copying machine, includes an image processing device which forms a single image by connecting a plurality of input images in such a manner as to overlap partially, so that the image forming apparatus of this type forms, in other words, prints out on a recording medium (e.g., a paper sheet) an image based on the image formed by the image processing device. When a copying machine makes, on a recording medium, a copy of an original larger than a scanner size which is defined as the largest readable size of an image reading section, the image processing device equipped therein takes the following procedure, for example.

In the first place, an original image is divided into a plurality of sub-images in such a manner as to partially overlap and the sub-images are read separately. Then, the sub-images thus read are connected to restore the original image, and the size of the restored original image is reduced to the size of a recording medium, after which the resorted original image is outputted onto the recording medium.

For example, Japanese Laid-open Patent Application No. 314263/1992 (Japanese Official Gazette, Tokukaihei No. 4-314263, published on Nov. 5, 1992) discloses an image processing device which functions in the following manner. That is, binary conversion processing and edge extraction processing with the binary image are conducted for each of a plurality of input images. Subsequently, the input images are compared one with another by means of pattern matching. Then, the input images are connected in such a manner that their edges having matching characteristics are overlapped.

According to the arrangement disclosed in the above publication, characteristics data of the input images obtained by the binary conversion processing followed by the edge extraction processing are compared by means of pattern matching. Thus, in case of text images composed of characters, image characteristics can be readily obtained by the edge extraction processing following the binary conversion processing, and therefore, two input images can be connected to each other in a relatively accurate manner. However, in case of shadow images or picture images, image characteristics can not be easily obtained by the edge extraction processing following the binary conversion processing, and therefore, matching portions of the two input images can not be readily found from comparison by means of pattern matching. Hence, two input image can not be connected accurately, and there arises a problem that a plurality of input images can not be resorted to a single image.

SUMMARY OF THE INVENTION

The present invention is devised to solve the above problems, and therefore, has an object to provide an image processing device which can restore a single image by connecting a plurality of input images accurately whether the input images are character, shadow or picture images.

In order to fulfill the above and other objects, an image processing device of the present invention is characterized by comprising:

a matching data generating section for generating matching data for each pixel in each of a plurality of input images by using multi-value image data thereof, the matching data representing characteristics of each pixel;

a region classifying section for classifying each pixel into one of a plurality of regions, which have been defined in advance based on kinds of images, by using the multi-value image data, the area classifying section also appending identification data exhibiting a result of classification to data of each pixel;

a binary converting section for converting the multi-value image data processed by the region classifying section into binary image data;

a pattern matching processing section for extracting a matching portion from data of each input image processed by the binary conversion section based on the identification data and matching data; and a connection processing section for connecting the binary image data of each input image in such a manner that the matching portions extracted by the pattern matching processing section overlap.

According to the above arrangement, the matching data generating section generates the matching data for each pixel in each of a plurality of input images by using multi-value image data thereof so as to represent characteristics of each pixel. The region classifying section classifies each pixel into one of a plurality of regions, which have been defined in advance based on kinds of images, by using the multi-value image data, and also appends identification data exhibiting a result of classification to data of each pixel. The binary converting section converts the multi-value image data processed by the region classifying section into binary image data. The pattern matching processing section extracts a matching portion from data of each input image processed by the binary conversion section based on the identification data and matching data. The connection processing section connects the binary image data of each input image in such a manner that the matching portions extracted by the pattern matching processing section overlap.

Thus, according to the image processing device of the present invention, the pattern matching processing is conducted adequately depending on the kind of region to which each pixel belongs, and the matching portions of the input images can be extracted based on such pattern matching processing by using the matching data of each pixel generated in detail from the multi-value image data and the identification data of the region into which the pixel is classified in a reliable manner based on the multi-value image data. Consequently, a plurality of input images can be connected accurately to restore a single image whether the input images belong to any of the pre-defined regions including the character, shadow, picture, and background regions, for example.

For a fuller understanding of the nature and advantages of the invention, reference should be made to the ensuing detailed description taken in conjunction with the accompanying drawings.

BRIEF DESCRIPTION OF THE DRAWINGS

FIG. 12(a) is a view explaining a state where rectangles are provided in the matching image in pattern matching processing (S53) in FIG. 11;

FIG. 12(b) is a view explaining a state where rectangles are provided in the reference image in the pattern matching processing (S53) in FIG. 11;

FIG. 18 is a timing chart showing data processing timing during the pattern matching processing by the image processing device of FIG. 16; and FIG. 19 is a timing chart showing data processing timing during the pattern matching processing by the image processing device of FIG. 1.

DESCRIPTION OF THE EMBODIMENTS

Embodiment 1

Referring to FIGS. 1 through 10, the following description will describe an example embodiment of the present invention.

Figure 1:
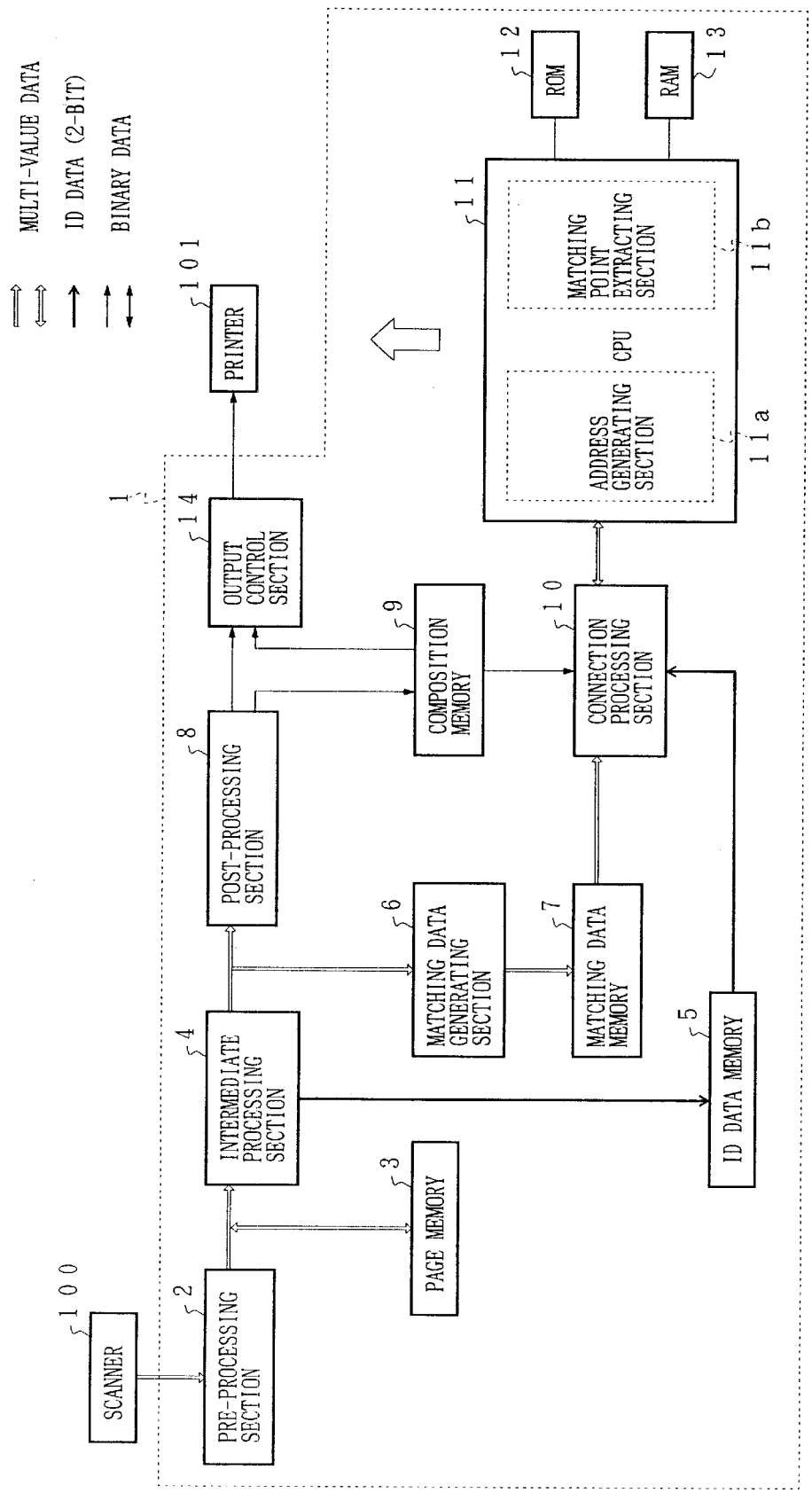
FIG. 1 is a block diagram depicting an arrangement of an image processing device in accordance with an example embodiment of the present invention.
Figure 2:
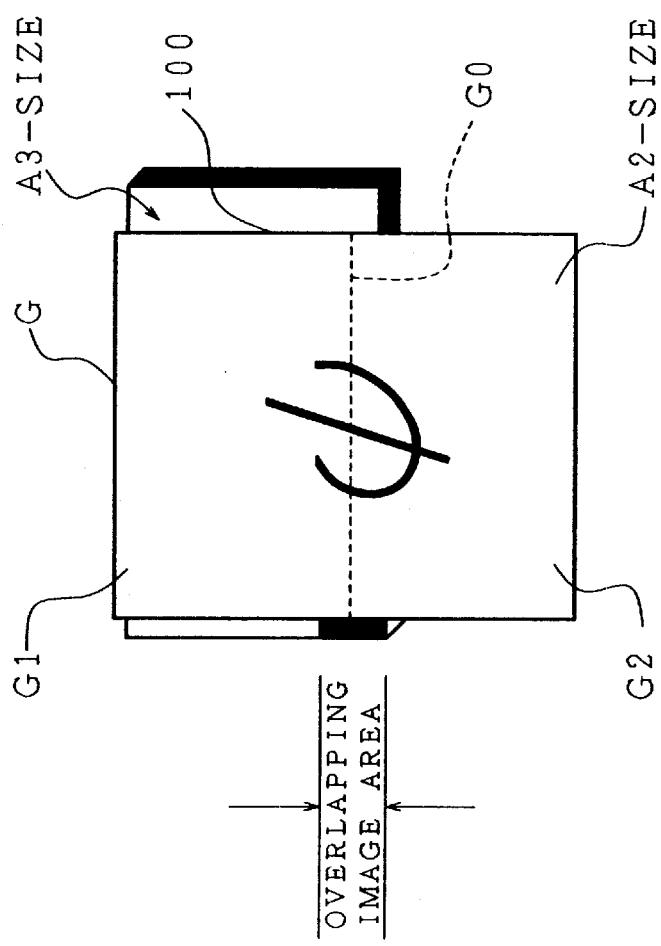
FIG. 2(a) is a view explaining a reading action of a matching image by a scanner which reads and inputs an image to the image processing device of FIG. 1.
FIG. 2(b) is a view explaining the matching image read by the scanner.
Figure 2:
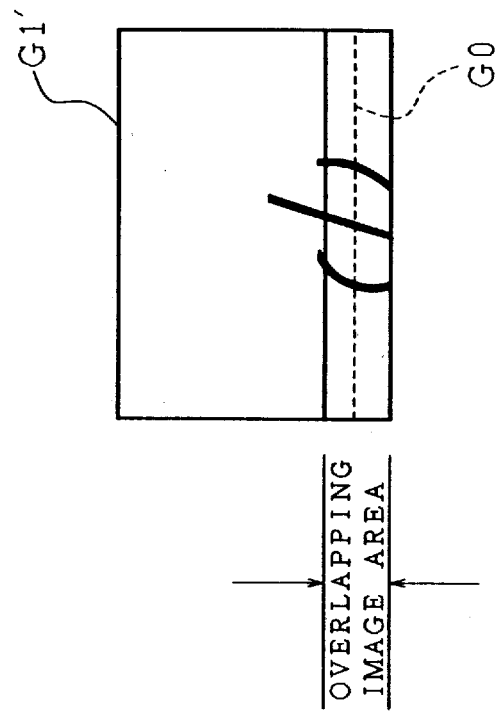
Figure 3:
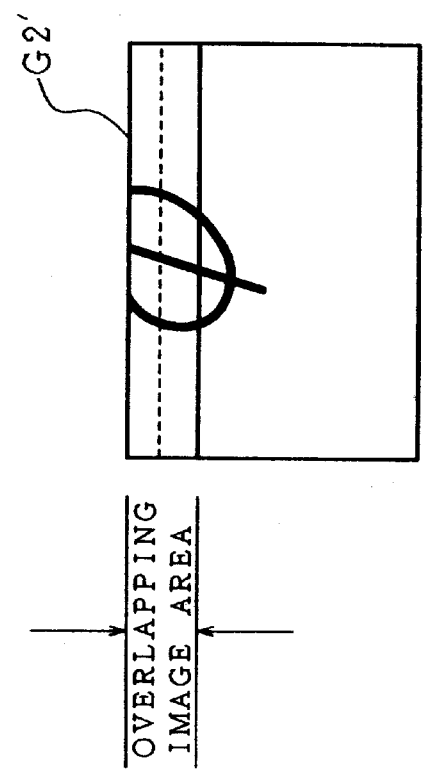
FIG. 3(a) is a view explaining a reading action of a reference image by the scanner.
FIG. 3(b) is a view explaining the reference image read by the scanner.
Figure 3:
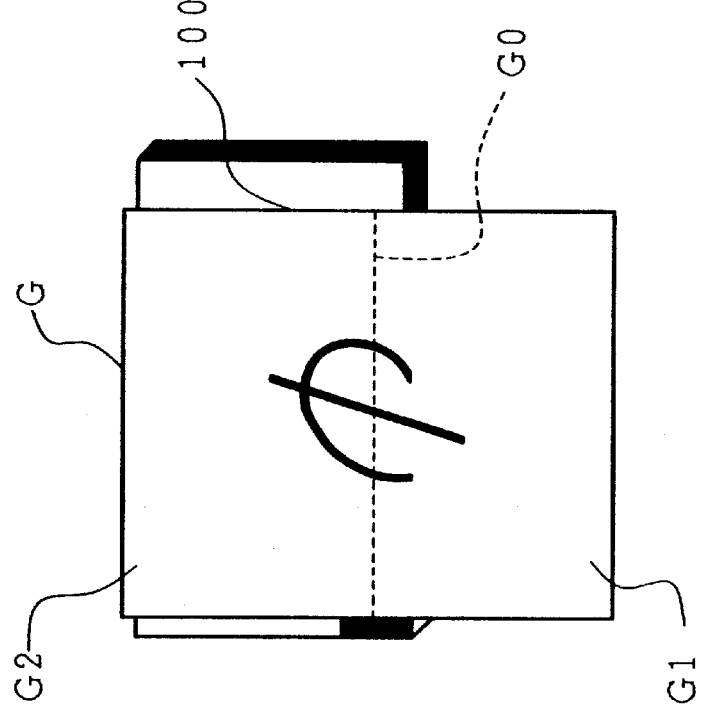

FIG. 1 is a block diagram depicting an arrangement of an image forming apparatus furnished with an image processing device in accordance with the present embodiment.

The image processing device 1 applies predetermined image processing to multi-value image data inputted from a scanner 100 and outputs processed image data to a printer 101. Thus, the image processing device 1 comprises a pre-processing section 2, a page memory 3, an intermediate processing section (region classifying means) 4, an identification data memory 5, a matching data generating section (matching data generating means) 6, a matching data memory 7, a post-processing section (binary converting means) 8, a composition memory 9, a connection processing section (pattern matching processing means, connection processing means) 10, a CPU 11, a ROM 12, a RAM 13, and an output control section 14.

The pre-processing section 2 applies pre-processing to multi-value image data inputted from the scanner 100. Here, the pre-processing includes generation of monochrome reference data, a gamma correction, a shading correction, etc. The page memory 3 temporarily stores the multi-value data which have been pre-processed by the pre-processing section 2. The intermediate processing section 4 reads out the multi-value image data from the page memory 3 and applies classification processing, filtering processing, and magnification (scaling up/down) processing to the same. The identification memory 5 stores 2-bit identification data which are appended to each pixel to classify each pixel into a character region, a shadow region, a picture region, or a background region (background image) for the classification processing by the intermediate processing section 4.

The matching data generating section 6 applies matrix processing to the multi-value image data processed by the intermediate processing section 4, and generates matching data based on a difference between the highest density and the lowest density or a difference between the highest luminance and the lowest luminance of a plurality of pixels within the matrix provided in the multi-value image data.

It should be noted that the accuracy of the pattern matching is the same whether the matching data are generated based on the data related to the density or luminance of the pixels. However, in order to generate the matching data from the luminance of the pixels, a color space of density should be converted to that of luminance. The matching data memory 7 stores the matching data generated by the matching data generating section 6 for each pixel.

The post-processing section 8 applies binary conversion processing or the like to the multi-value image data which have been processed by the intermediate processing section 4, and outputs binary image data as a result. The composition memory 9 stores two kinds of composition data: the binary composition image data obtained by the processing applied by the post-processing section 8; and the binary composition image data obtained by the connection processing section 10.

The connection processing section 10 applies pattern matching processing to the binary image data based on the matching data stored in the memory 7, and subsequently connects two kinds of composition data stored in the composition memory 9 based on the result of the pattern matching processing.

The CPU 11 controls an overall action (processing by each components) of the image processing device 1. In particular, the CPU 11 controls the pattern matching processing and connection processing by means of the connection processing section 10.

To be more specific, the CPU 11 is furnished with two sections: a matching point extracting section 11b which extracts overlapping portions (matching points) from the images in the form of two kinds of composition data based on the result of the pattern matching processing; and an address generating section 11a which generates addresses in the composition memory 9 used when two kinds of composition data are connected at the extracted matching points so as to overlap each other. The CPU 11 supplies the address data generated by the address generating section 11a to the connection processing section 10.

Accordingly, the connection processing section 10 combines two kinds of composition data based on the address data supplied from the CPU 11. The connection processing section 10 is provided to reduce processing load on the CPU 11 to speed up the processing.

The ROM 12 stores a main program of the CPU 11, and the RAM 13 is a work memory for the CPU 11 and composed of an SRAM, for example.

The output control section 14 reads out connected binary image data from the composition memory 9, and supplies the same to the printer 101. Accordingly, the printer 101 prints out the image data inputted from the output control section 14 onto a recording medium, such as a copy sheet. The printer 101 can be replaced with other kinds of output devices, such as a facsimile machine.

The image processing device 1 can read an original image even if the size thereof is larger than the largest readable size of the scanner 100 in a single reading action. To be more specific, the image processing device 1 can be switched between two modes: a normal mode in which the scanner 100 reads an original up to the largest readable size in a single reading action; and a connection mode in which the scanner 100 reads an original larger than the largest readable size in more than one reading action.

When the normal mode is selected, the image data, to which the binary conversion processing has been applied by the post-processing section 8, are inputted not through the composition memory 9 but directly to the output control section 14. On the other hand, when the connection mode is selected, the image data, to which the binary conversion processing has been applied by the post-processing section 8, are stored into the composition memory 9 first, and thence the connection processing is applied to the same by the connection processing section 10, after which the image data are inputted into the output control section 14.

The following will describe the procedure when the image processing device 1 is set in the connection mode. In the following example case, the scanner 100 reads an A2-size original when its largest readable size is A3. In the first place, as shown in FIG. 2(a), the scanner 100 reads the upper half image G1' above the longitudinal center position G0 of the A2-size original with a part of the lower half image G2 around the center position G0, whereby a read image G1' as shown in FIG. 2(b) is obtained. Then, as shown in FIG. 3(a), the scanner 100 reads the lower half image G2 below the longitudinal center position G0 of the A2-size original with a part of the upper half image G1 around the center position G0, whereby a read image G2' as shown in FIG. 3(b) is obtained.

Here, when the scanner 100 reads the original image G of an A-2 size by repeating the reading action twice, the original image G is placed in such a manner that the scanner 100 reads the upper half image G1 with a part of the lower half image G2, and subsequently the lower half image G2 with a part of the upper half image G1. Consequently, as shown in FIGS. 2(b) and 3(b), the read images G1' and G2' obtained by the reading action repeated twice include overlapping image areas each including the center position G0 of the original image G. Accordingly, by connecting the read images G1' and G2' in such a manner as to match their respective overlapping image areas, the image data of the entire original image G can be obtained.

To conduct the above connection processing, the CPU 11 specifies the address data of the read image G1' (matching image) and those of the read image G2' (reference image) in the composition memory 9 to the connection processing section 10, so that the matching image G1' and reference image G2' are connected to each other.

Figure 4:
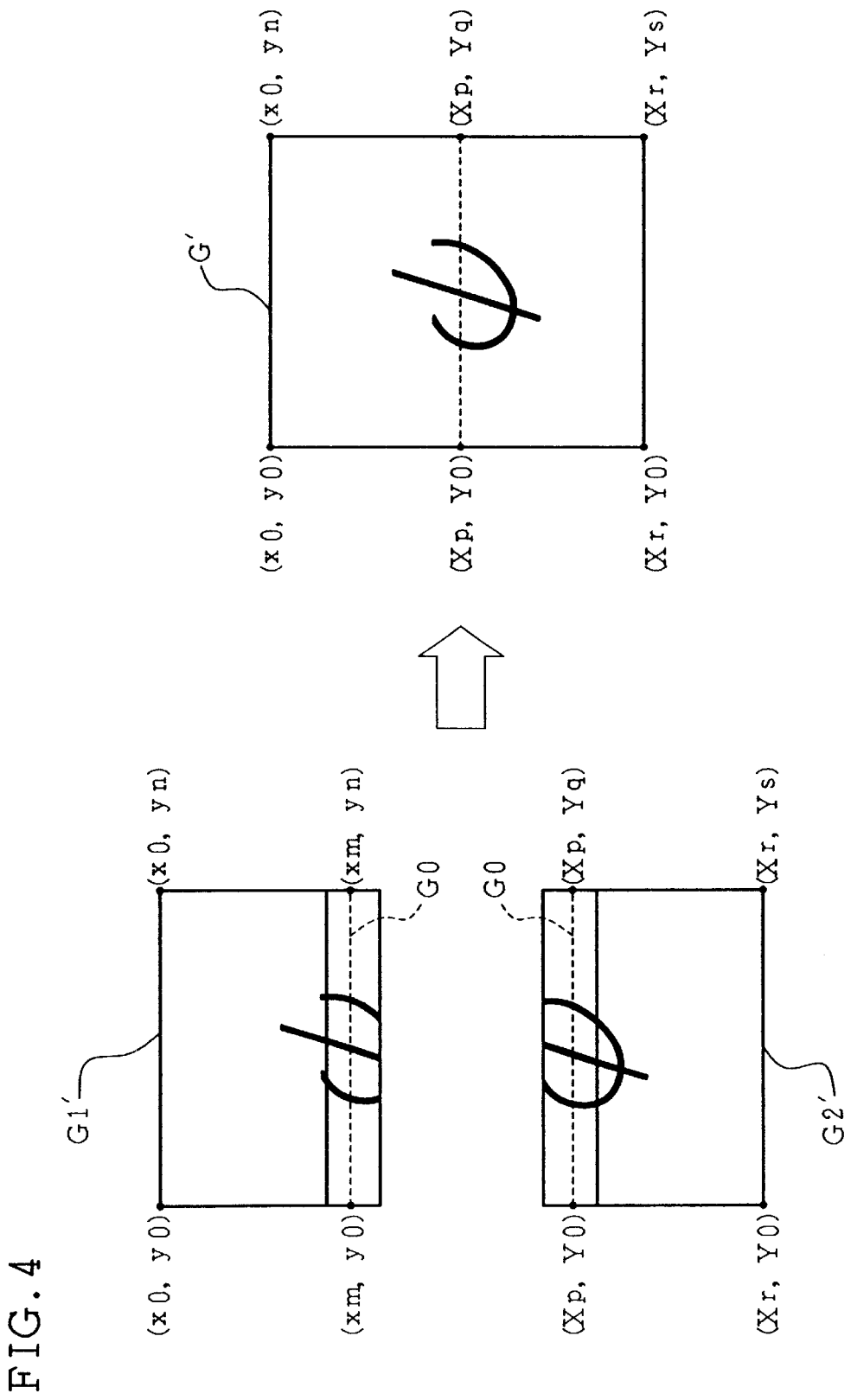
FIG. 4 is a view explaining a connecting action of the matching image of FIG. 2(b) and the reference image of FIG. 3(b)

To be more specific, in the event that the matching image G1' and reference image G2' are connected to each other by using a center position G0 of the original G as the matching point, given that, as shown in FIG. 4, (xm, y0) and (xm, yn) are the addresses stored in the composition memory 9 for the both ends along the center point G0 of the original G in the matching image G1', and (xp, y0) and (xp, yq) are those in the reference image G2', then the CPU 11 outputs converting data to the connection processing section 10, which convert the addresses in the composition memory 9 in such a manner that (xm, y0) of the matching image G1' matches with (xp, y0) of the reference image G2', and (xm, yn) of the former matches with (xp, yq) of the latter. Subsequently, the connection processing section 10 connects the matching image G1' and reference image G2' in the composition memory 9 in accordance with the converting data, thereby producing composition image data G'.

Here, a matching point which specifies a position where the matching image and reference image are connected to each other is determined by the pattern matching processing conducted by the connection processing section 10, in which the matching data generated by the matching data generating section 6 are used.

Figure 5:
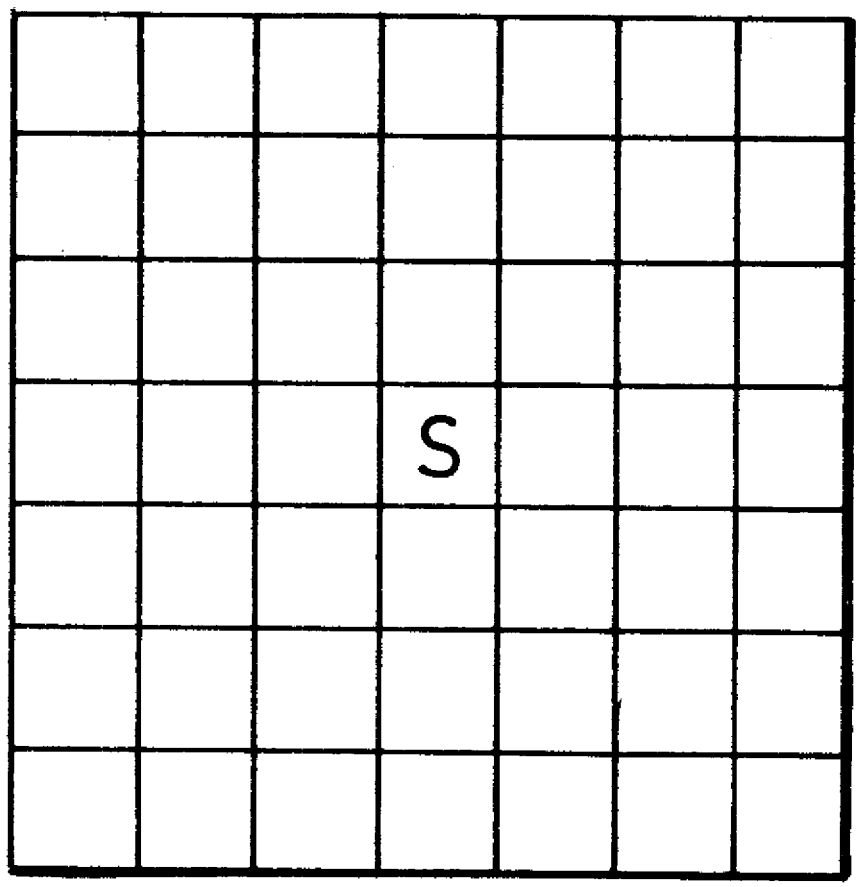
FIG. 5 is a view explaining a matrix used to compute matching data of each pixel by the image processing device of FIG. 1.
Figure 6:
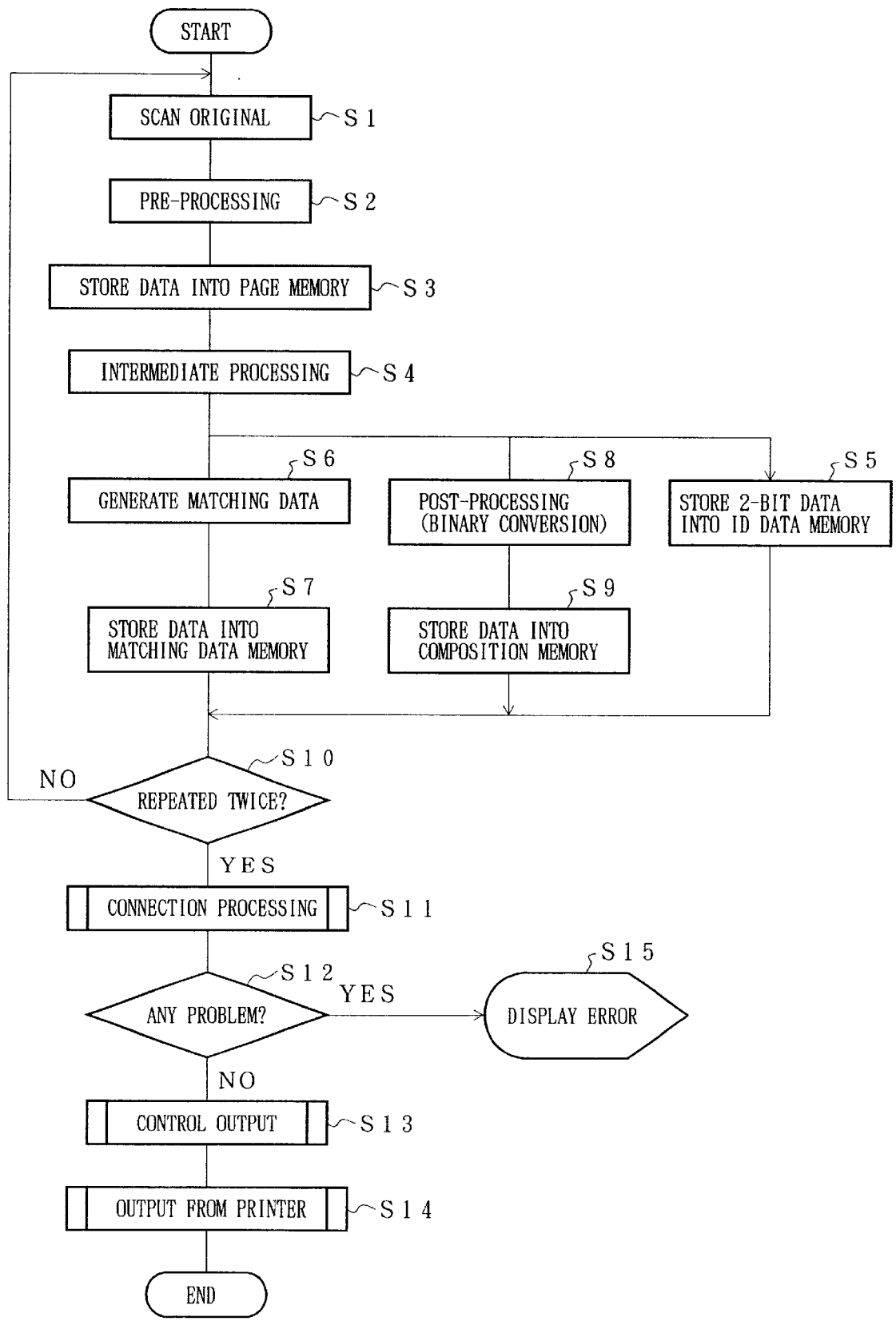
FIG. 6 is a flowchart detailing the operation procedure of a CPU of the image processing device of FIG. 1 when two input images are connected.
Figure 7:
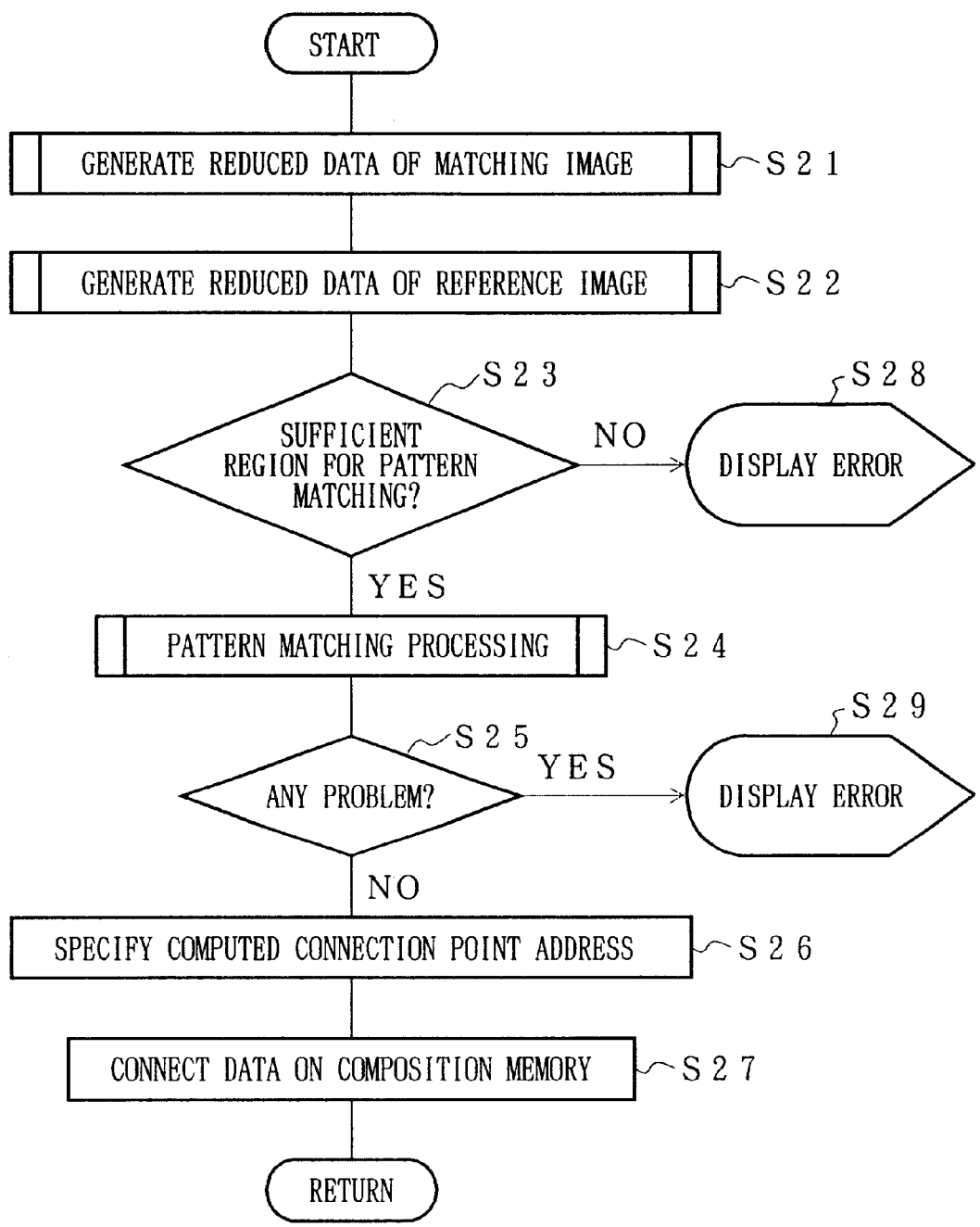
FIG. 7 is a flowchart detailing the operation procedure of the CPU of the image processing device of FIG. 1 during pattern matching processing.

The matching data generating section 6 provides a plurality of matrixes, each being composed of 7×7 pixels and having a target pixel S at the center as shown in FIG. 5, in each of the matching image and reference image which have been processed by the pre-processing section 2 and intermediate processing section 4. Then, the matching data generating section 6 computes a difference between the largest and smallest values of the density or luminance of the pixels forming each matrix, and sequentially stores the same to the matching data memory 7 so as to be used as the matching data of each target pixel S.

FIGS. 6 through 9 show flowcharts detailing the procedure of the connection processing by the image processing device. The following example will describe a case where an A2-size original is read twice by the scanner 100 with the largest readable size of A3, and data of two input images are connected to reproduce data of a single image. The number of the reading actions repeated by the scanner 100 during the connection mode, in other words, the number of input images in the form of data, is determined depending on the largest readable size of the scanner 100 and the size of an original to be read.

Upon input of image data from the scanner 100 (S1), the CPU 11 of the image processing device 1 activates the pre-processing section 2 to conduct the pre-processing, such as gamma correction and shading correction based on the monochrome reference data (S2), and stores the pre-processed image data into the page memory 3 (S3).

Then, the CPU 11 activates the intermediate processing section 4 to apply the intermediate processing to the image data stored in the page memory 3 (S4). The intermediate processing includes region classification processing, filtering processing, and magnification (scaling up/down) processing of the image data.

The region classification processing is conducted to classify each pixel into a character, shadow, picture, or background region based on the data obtained in the following manner. That is, the above data are obtained by providing a plurality of matrixes of a predetermined size each having an individual pixel at the center, and extracting from each matrix the number of pixels at the edge portion, the largest and smallest values of the pixel density, run-length of the pixels having the largest and smallest density values, and a distance between the pixels having the largest and smallest density values. Then, the CPU 11 stores 2-bit identification data for each pixel in the identification data memory 5 to specify their respective regions (S5).

Then, the CPU 11 activates the matching data generating section 6 to generate the matching data for the image data having been subjected to the intermediate processing (S6). As has been described, the matching data are generated in the following manner. That is, a plurality of matrixes, each being composed of 7×7 pixels and having an individual pixel contained in the image data as a target pixel S, are provided, and a difference between the largest and smallest values of density or luminance of the pixels in the matrix is computed as the matching data of the target pixel S, which are stored into the matching memory 7 (S7). Meanwhile, the CPU 11 activates the post-processing section 8 to subject the multi-value image data having been subject to the intermediate processing to binary conversion processing (S8), and stores the resulting binary image data into the composition memory 9 (S9).

The CPU 11 repeats Si through S9 for each of the matching image G1' and reference image G2' inputted from the scanner 100 separately. When the CPU 11 completes S1 through S9 for each of the matching image G1' and reference image G2' (S10), the CPU 11 activates the connection processing section 10 to conduct the connection processing (S11). Upon completion of the connection processing without any problem, the CPU 11 have the connection processing section 10 output the resulting image data to the printer 101 (S12, S13), whereupon the printer 101 starts to print out the image data onto a recording medium (paper sheet) (S14).

In case that a problem occurs during the connection processing, the CPU 11 displays an error message on the screen (S12 to S15).

Such a problem possibly occurs during the connection processing, for. example, when too much identification data representing the background region are appended to the pixels, and only a region smaller than a reference value can be used to find a matching point where the matching image and reference image are overlapped, or when the matching point is judged as being unreliable because the result of a correlation computation in the pattern matching does not attain a reference value.

As shown in FIGS. 2(b) and 3(b), when the overlapping image areas of the matching image G1' and reference image G2' can be recognized in advance, the matching data may be generated for the overlapping image areas alone to save processing time and a memory capacity.

The error message displayed in S15 may additionally include a message asking the user whether the reference image should be read again or not, so that when a problem occurs during the connection processing, S1 through S9 are repeated for the reference image when the user wishes so.

Further, as shown in FIGS. 2(a) and 3(a), when the scanner 100 reads the reference image G2' which is rotated by 180° with respect to the matching image G1', the data of the reference image G2' inputted from the scanner 100 are rotated by 180° before being stored into the page memory 3.

In the connection processing in S11, the identification data appended to the pixels in a predetermined section subjected to the pattern matching within the reference image are read out, and a sum of the identification data is computed for each kind of region. Then, the sums are compared with thresholds, and the section is classified into any of the four kinds of regions including the character, shadow, picture, and background regions.

The section classified into the background region is not subjected to the connection processing, thereby making it possible to save the processing time. Also, in order to speed up the pattern matching and improve the accuracy thereof, the matching data of the matching image and those of the reference image are reduced to a plurality of reducing ratios to produce a plurality kinds of reduced matching data of the matching image and reference image, and the pattern matching is conducted hierarchically with these reduced matching data in increasing order of reducing ratios. For example, the matching and reference images are reduced to 1/2, 1/4, and 1/8 both in the X and Y directions to produce the matching data reduced to 1/4, 1/16, and 1/64, respectively. Then, the pattern matching is conducted in four hierarchies including the image of 1/1 (original size) in order of 1/64, 1/16, 1/4, and 1/1.

In other words, the CPU 11 activates the connection processing section 10 to read out the matching data of the matching image stored-in the matching data memory 7, and subsequently produce the matching data of the matching image reduced to 1/4, 1/16, and 1/64, which are stored back into the matching data memory 7 (S21).

Further, the CPU 11 activates the connection processing section 10 to read out the matching data of the reference image stored in the matching data memory 7, and subsequently produce the matching data of the reference image reduced to 1/4, 1/16, and 1/64, which are stored back into the matching data memory 7 (S22).

Figure 8:
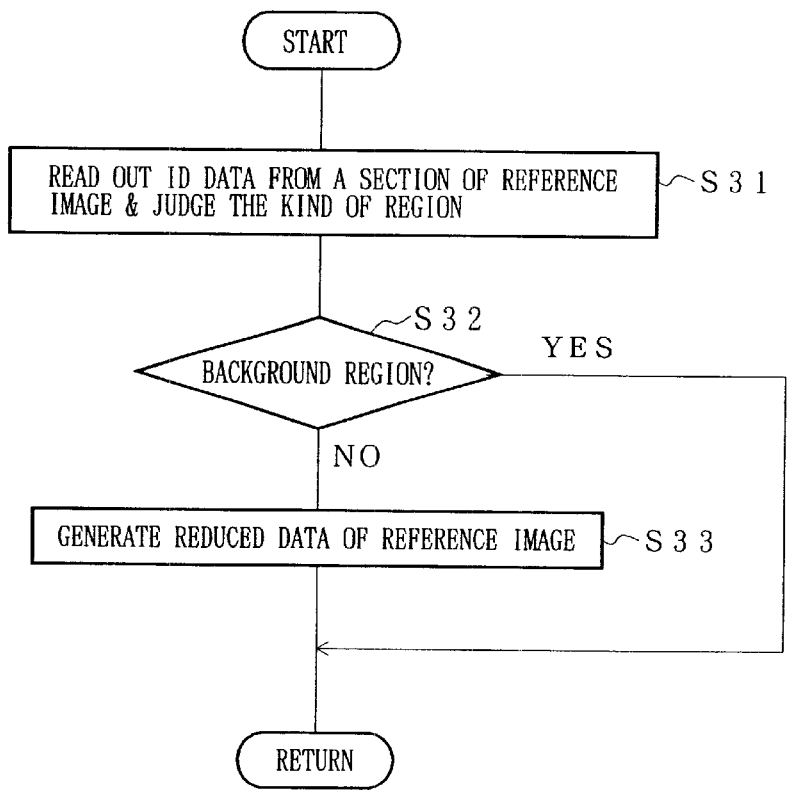
FIG. 8 is a flowchart detailing the operation procedure of the CPU in regard to reducing processing of the reference image (S22) in FIG. 7.

In the reducing processing of the matching data of the reference image, as shown in FIG. 8, whether a predetermined section is the background region or not is judged based on the identification data of each pixel stored in the identification data memory 5 first, and thence the matching data reduced to predetermined reducing ratios are produced if the section is judged as being any for the regions other than the background region (S31 through S33).

Then, the connection processing section 10 judges whether there is a sufficiently large area for the pattern matching or not (S23). In case that there is a sufficient area for the pattern matching, the connection processing section 10 conducts the pattern matching using the matching data of the matching images and reference images reduced to their respective reducing ratios (S24).

When the pattern matching is completed without any problem, the CPU 11 generates the address data in the composition memory 9 for the matching points where the matching image and reference image have been matched with each other during the pattern matching, and specifies the same to the connection processing section 10 (S25, S26).

The connection processing section 10 connects the matching image and reference image to each other in the composition memory 9 based on the address data specified by the CPU 11 (S27).

In case that there is not a sufficient area for the pattern matching in S23, or there occurs a problem in the pattern matching in S25, the CPU 11 displays an error message (S23 to S28 or S25 to S29). For example, when the background region occupies a too large area, or when it turns out that there is no overlapping image area as the result of the pattern matching, the CPU 11 displays an error message and ends the job, or displays a message asking the user whether the reference image should be read again or not to repeat S1 through S9.

Figure 9:
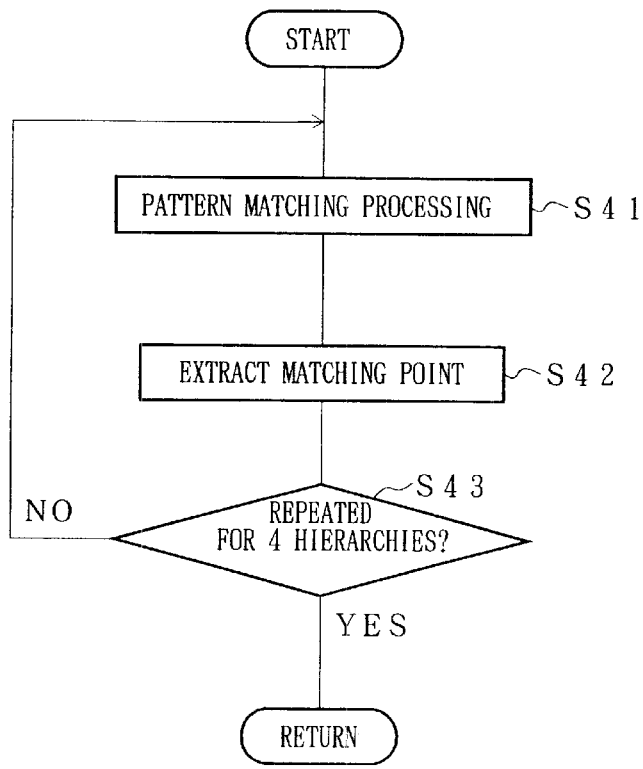
FIG. 9 is a flowchart detailing the operation procedure of the CPU in regard to the pattern matching processing (S24) in FIG. 7.

In the pattern matching processing in S24, as shown in FIG. 9, the pattern matching of the matching image and reference image is repeated as many times as the number of the hierarchies using the matching data of the matching image and those of the reference image reduced to 1/1, 1/4, 1/16, and 1/64 (S41 through S43).

Figure 10:
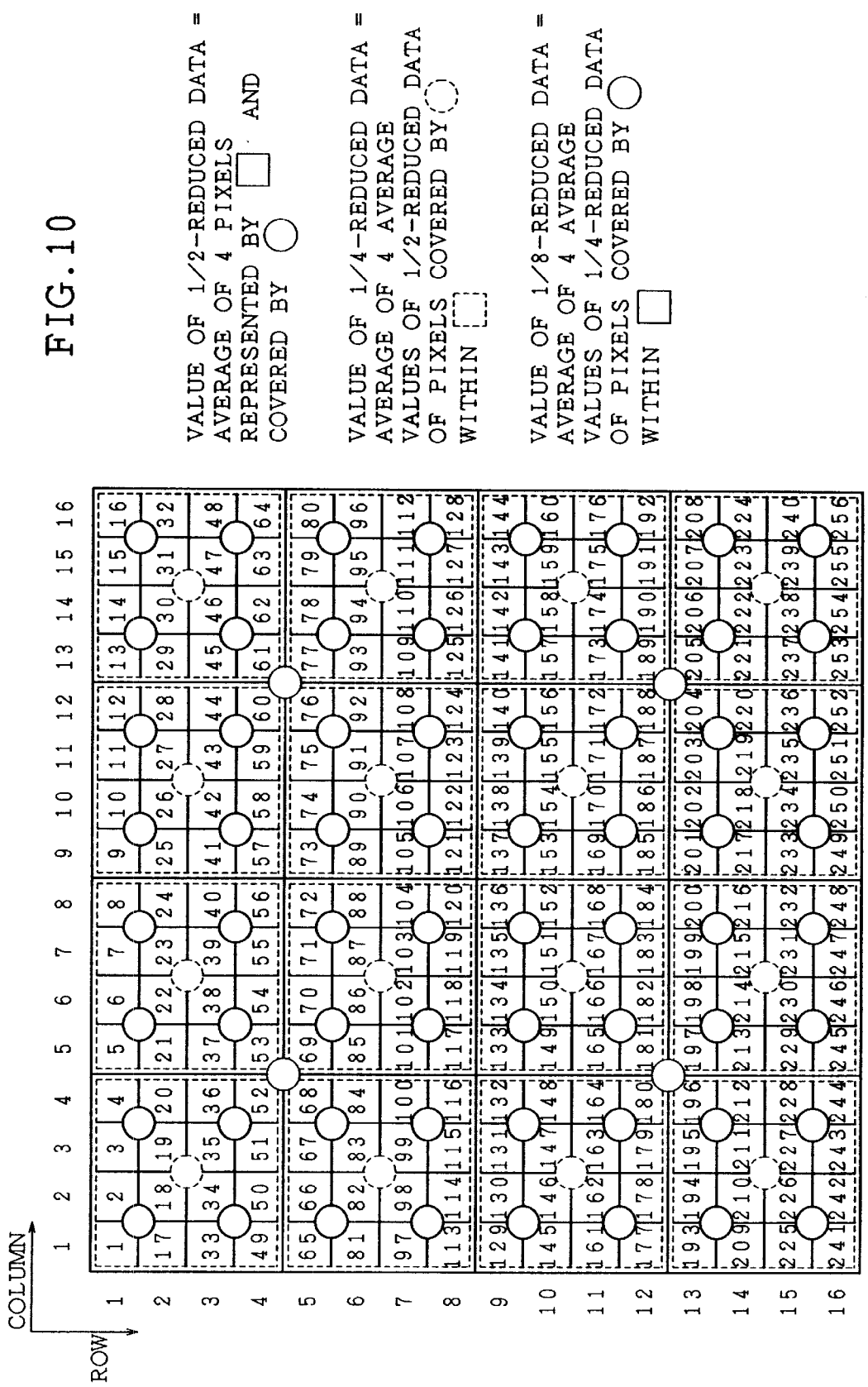
FIG. 10 is a view explaining the procedure to generate matching data for each pixel in each of a plurality of reduced images by the image processing device of FIG. 1.

FIG. 10 shows an example method of generating the matching data reduced to predetermined reducing ratios during the reducing processing of the matching data in S21 and S22, in which a simple average of the matching data of four neighboring pixels are computed.

To be more specific, with the image data composed of 16×16 pixels, the matching data of the pixels of the first to eighth rows on the first and second columns are sequentially read, and averages of the matching data of four neighboring pixels are computed, whereby four kinds of matching data reduced to 1/4 are obtained along the row direction. Then, the matching data of the pixels of the first to eighth rows on the third and fourth columns are sequentially read, and averages of four neighboring pixels are computed, whereby four kinds of matching data reduced to 1/4 are obtained along the row direction. Then, with 8 kinds of matching data reduced to 1/4, averages of the neighboring four kinds of matching data are computed, whereby two kinds of matching data reduced to 1/16 along the row direction are obtained. In this manner, upon reading the pixel of the eighth row on the eighth column, 16 kinds of matching data reduced to 1/4, four kinds of matching data reduced to 1/16, one kind of matching data reduced to 1/64 are obtained. Therefore, by sequentially reading the matching data of each pixel of the image of the original size (1/1) only once, the matching data reduced to 1/4, 1/16, and 1/64 can be obtained.

With the above processing, the image processing device of the present embodiment extracts the matching data used in specifying the matching point at which the matching image and reference image are overlapped in the form of multi-value image data which have not been subjected to the binary conversion processing, so that the pattern matching of the matching image and reference image can be conducted accurately based on the matching data extracted in the form of multi-value image data.

In addition, since the matching data are generated in four hierarchies for each of the matching image and reference image to conduct the pattern matching in four hierarchies, the matching point can be determined at higher accuracy. In particular, since the pattern matching is repeated for four hierarchies with the four kinds of matching data of the reduced matching image and reference image in increasing order of reducing ratios, the pattern matching is conducted first in the broadest range with an image having the least number of pixels, and thence the range of the pattern matching is narrowed gradually using an image having the larger number of pixels, thereby making it possible to save pattern matching time and improve the accuracy.

A time required for the pattern matching processing can be further saved by classifying each pixel into the character, shadow, picture, or background region, and omitting the section(s) composed of the pixels classified into the background region from the pattern matching.

Embodiment 2

Figure 11:
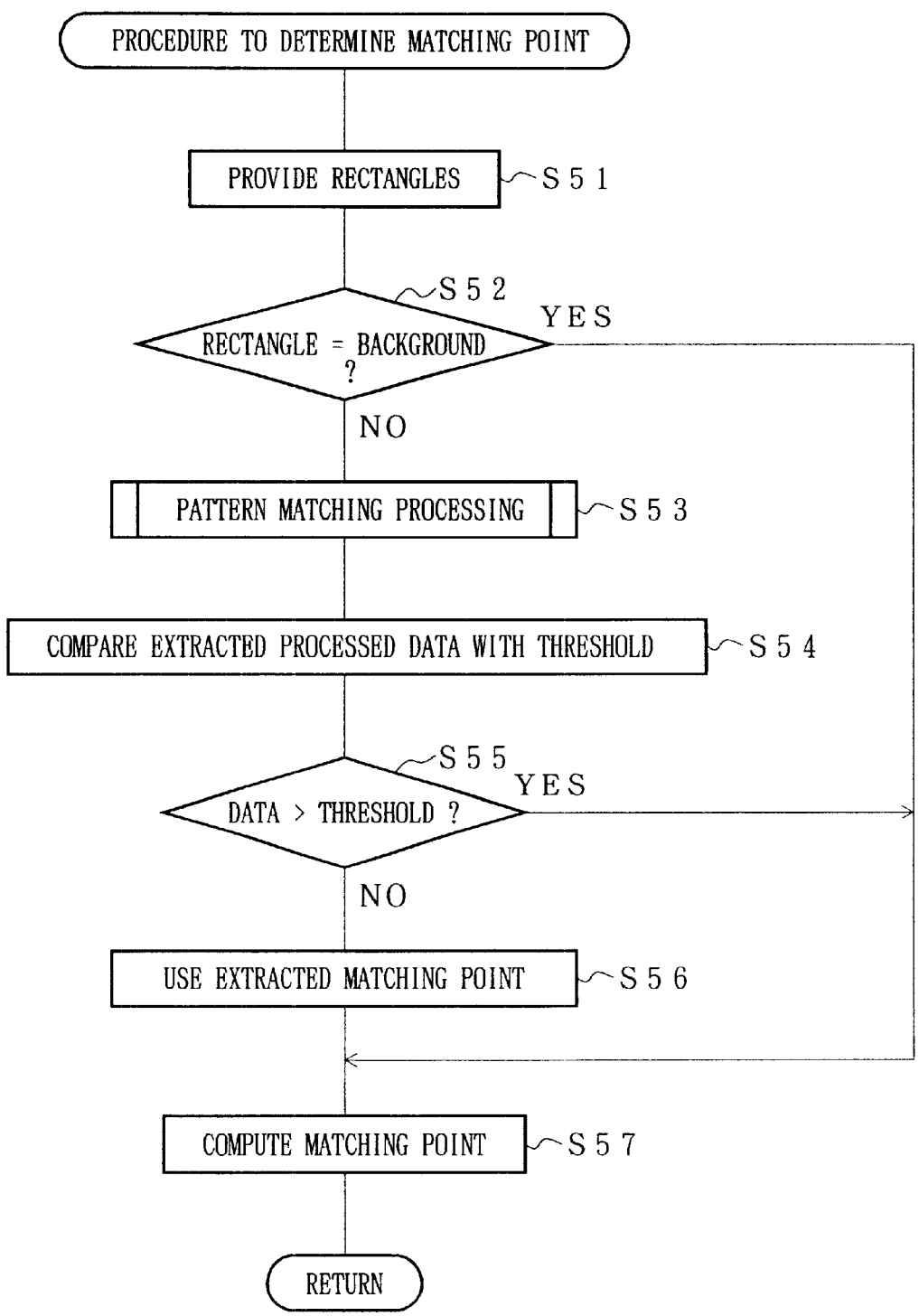
FIG. 11 is a flowchart detailing the operation procedure of a CPU of an image processing device in accordance with another example embodiment of the present invention.

FIG. 11 shows a flowchart detailing the procedure of the matching point determining processing by an image processing device in accordance with another example embodiment of the present invention.

The image processing device of the present embodiment can speed up the processing, when the overlapping image areas of the matching image and reference image are recognized in advance, by dividing of the overlapping image area (image data) of the reference image into a plurality of rectangles each having a plurality of pixels and conducting the pattern matching with these divided rectangles. Also, a memory area is secured in the memory to store the image data of the overlapping image areas while managing the addresses thereof.

For the above processing, the CPU 11 initially provides a plurality of rectangles of a predetermined size in the reference image (S51), and judges whether each rectangle is the background region or not (S52). These rectangles correspond to image areas in the other input image (matching image) in the present invention.

For example, as shown in FIG. 12(b), a plurality of rectangles each composed of 256×64 pixels are provided in the overlapping image area of the reference image. Then, the identification data of the pixels contained in each rectangle are read out from the identification data memory 5. The identification data of the character, shadow, picture, and background regions in each rectangle are added up separately, and by comparing the sums with predetermined thresholds, each rectangle is judged whether it belongs to the character, shadow, picture, or background region. The CPU 11 applies the pattern matching processing to all the rectangles judged as not belonging to the background region (S53).

The pattern matching processing is conducted to extract, as the matching point, the coordinate at the center of an image area within the overlapping image area of the matching image which approximates to any of the rectangles of the reference image.

In case that, as shown in FIG. 12(a) for example, a rectangle of the reference image subjected to the pattern matching is judged as belonging to the character region, a matching section composed of 512×256 pixels is provided in the matching image. In case that a rectangle of the reference image subjected to the pattern matching is judged as belonging to the shadow or picture region, a matching section composed of 384×128 pixels is provided in the matching image.

In other words, a matching section is provided in the matching image for each rectangle provided in the reference image in a size which is larger than the rectangle and adequate for the kind of region to which the rectangle belongs. The size of the matching section is varied depending on the kind of region because the accuracy of the pattern matching in each of the shadow region and picture region and character region should be equal while the shadow and picture regions may have more approximate image portions than does the character region.

In the matching area, sections as large as the rectangle of the reference image (256×64 pixels) are provided successively by being shifted per pixel, and a difference between the matching data of the pixels at the corresponding positions in the sections provided in the matching image and those in the rectangles provided in the reference image is calculated. Then, the coordinate at the center in the section having the smallest sum of the absolute values of the differences in the matching data is extracted as the matching point.

The size of the rectangle of the reference image and the size of the sections provided in the matching image shown in FIG. 12 are represented by numerical values at the time of pattern matching with the reduction ratio of 1/1. When the pattern matching is conducted with the data reduced to 1/4, 1/16, or 1/64, the size of the rectangles provided in the reference image and the size of the sections provided in the matching image are reduced to 1/2, 1/4, or 1/8 both in horizontal and vertical directions.

Upon completion of the pattern matching processing in S53, the CPU 11 compares the extracted process data used in the pattern matching process with a predetermined threshold (S54). The extracted process data are defined as a sum of the absolute values of differences in the matching data of the corresponding pixels between the section of the matching image including the extracted matching point and the rectangle of the reference image.

When the extracted process data are larger than the threshold, the CPU 11 judges that the rectangle provided in the reference image does not overlap the corresponding portion of the matching image, and does not use the extracted matching point in the following processing. On the other hand, when the extracted process data are smaller than the threshold, the CPU 11 judges that the rectangle provided in the reference image overlaps the corresponding portion of the matching image, and uses the extracted matching point in the following processing (S56). Note that S52 through S56 are repeated successively for each of the rectangles provided in the reference image.

In this manner, of all the rectangles provided in the overlapping image area of the reference image, the matching point is determined for the rectangles except for those belonging to the background region and those judged as not overlapping the matching image. For the matching points which were not adopted in S56, intermediate points or equational allocation points of an approximate line linking two adjacent (closest) matching points are computed (S57). Also, new matching points are computed for the matching points of the rectangles belonging to the background region in the same manner as for the non-adopted matching points in S56. Thus, in the matching point determining processing by the image output device 1, the matching points corresponding to the pixels at the center of each rectangle provided in the reference image are determined by the processing in S56 or S57.

Figure 13:
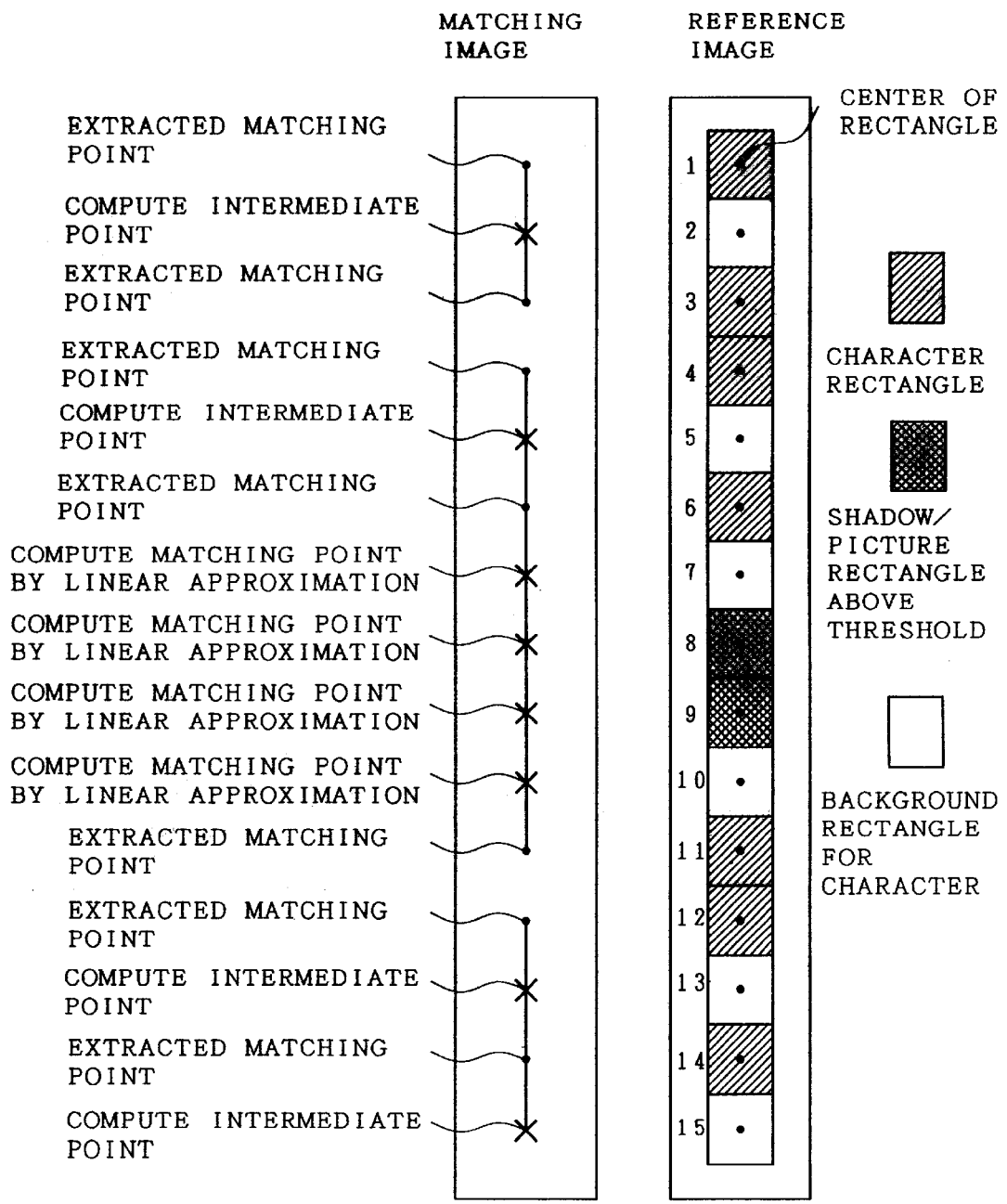
FIG. 13(a) is a view explaining matching point computing processing (S57) in FIG. 11.
FIG. 13(b) is a view explaining a state where the rectangles are classified into their respective kinds of region to set a matching point in each.

For example, assume that in FIG. 13(b), of fifteen rectangles R1 through R15 provided in the reference image, R2, R5, R7, R10, R13, and R15 are the rectangles belonging to the background region, and R8 and R9 are the rectangles judged as having no overlapping sections from the comparison of the threshold with the sum of the absolute values of differences in the pixel data, then the following processing is conducted. That is, as shown in FIG. 13(a), for the rectangles R1, R3, R4, R6, R11, R12, and R14, the matching points of the matching image extracted in the pattern matching processing are directly used. For the rectangles R2, R5, R13, and R15, the intermediate points of the extracted matching points of the adjacent rectangles are used as the matching points. For the rectangles R7 through R10, the equational allocation points between the matching points extracted for the rectangles R6 and R11 are used as the matching points.

The CPU 11 overlaps the overlapping image area of the reference image on the overlapping image area of the matching image based on the matching points thus determined. To be more specific, a rectangle is cut out from the reference image in such a manner that the rectangle has a line linking the center point of two adjacent rectangles as one of its sides, and the cut out image is overlapped on the matching image in such a manner that the above specific side is positioned between the corresponding matching points on the overlapping image area of the matching image.

Figure 14:
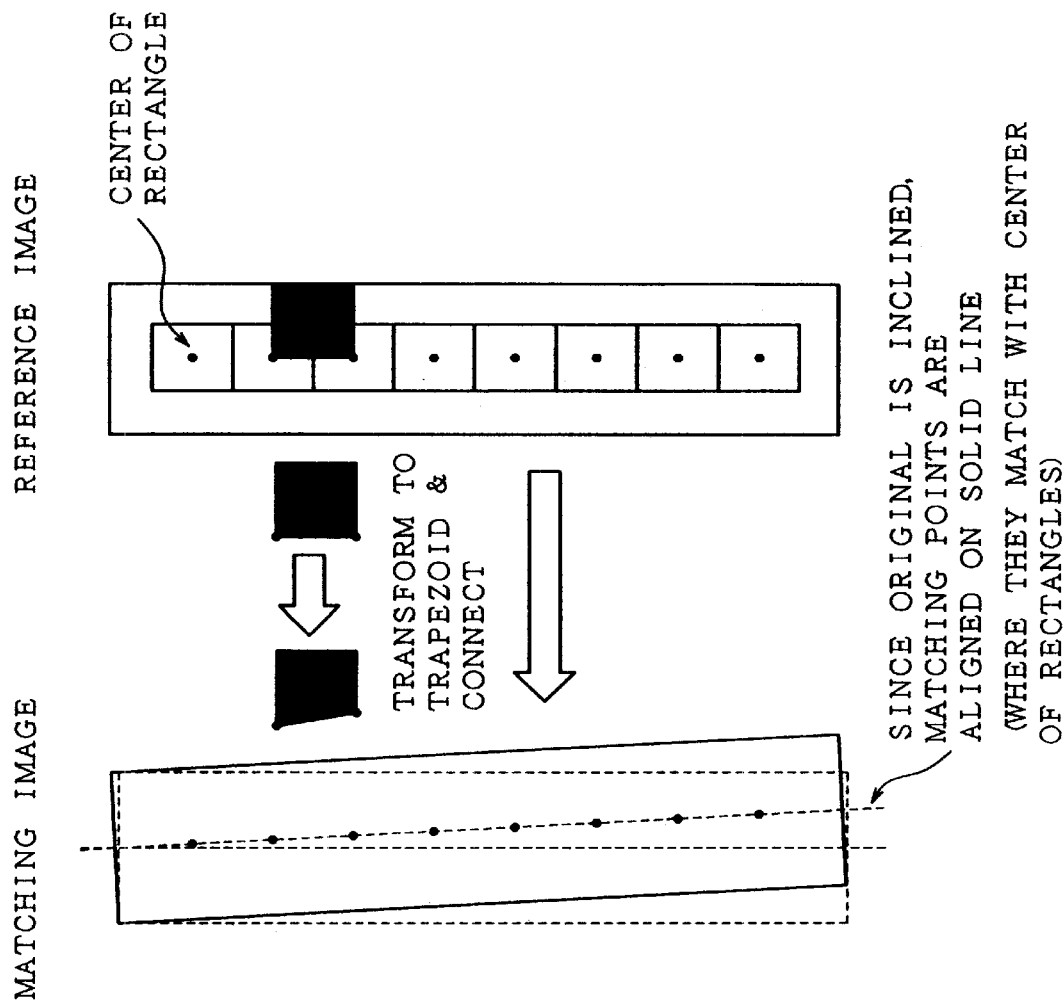
FIG. 14 is a view explaining the procedure during connection processing in FIG. 11 when a plurality of extracted matching points of the matching image are inclined.

As shown in FIG. 14, if a plurality of extracted matching points on the matching image are inclined, the rectangle of a predetermined size cut out from the reference image is transformed to a trapezoid at the connection processing. Consequently, an inclination between the matching image and reference image can be corrected.

As has been discussed, by dividing the overlapping image area of the matching image into a plurality of rectangles and extracting the images that match with these rectangles from the reference image, the number of pixels subjected to a single pattern matching can be reduced. Consequently, the connection processing section 10 which conducts the pattern matching processing can be downsized.

Also, each rectangle is judged whether it belongs to the character, shadow, picture, or background region, and the pattern matching processing is omitted for those belonging to the background region. Further, whether each rectangle has a matching section in the overlapping image area of the matching image is judged, and the matching points in the matching image sections are extracted only for the rectangles having the matching sections. Consequently, the matching points are extracted only for the rectangles from which the matching points can be extracted accurately, thereby making it possible to speed up the pattern matching processing.

In the event that a series of rectangles in the reference image are not subjected to the matching point extraction processing by means of pattern matching, the accuracy of the pattern matching of the entire image is deteriorated, thereby making it difficult to connect the matching image and reference image accurately. To solve this problem, if the number of the rectangles which are not subjected to the matching point extraction processing exceeds a predetermined value, the matching image and reference image may be merely outputted without being overlapped.

Figure 15:
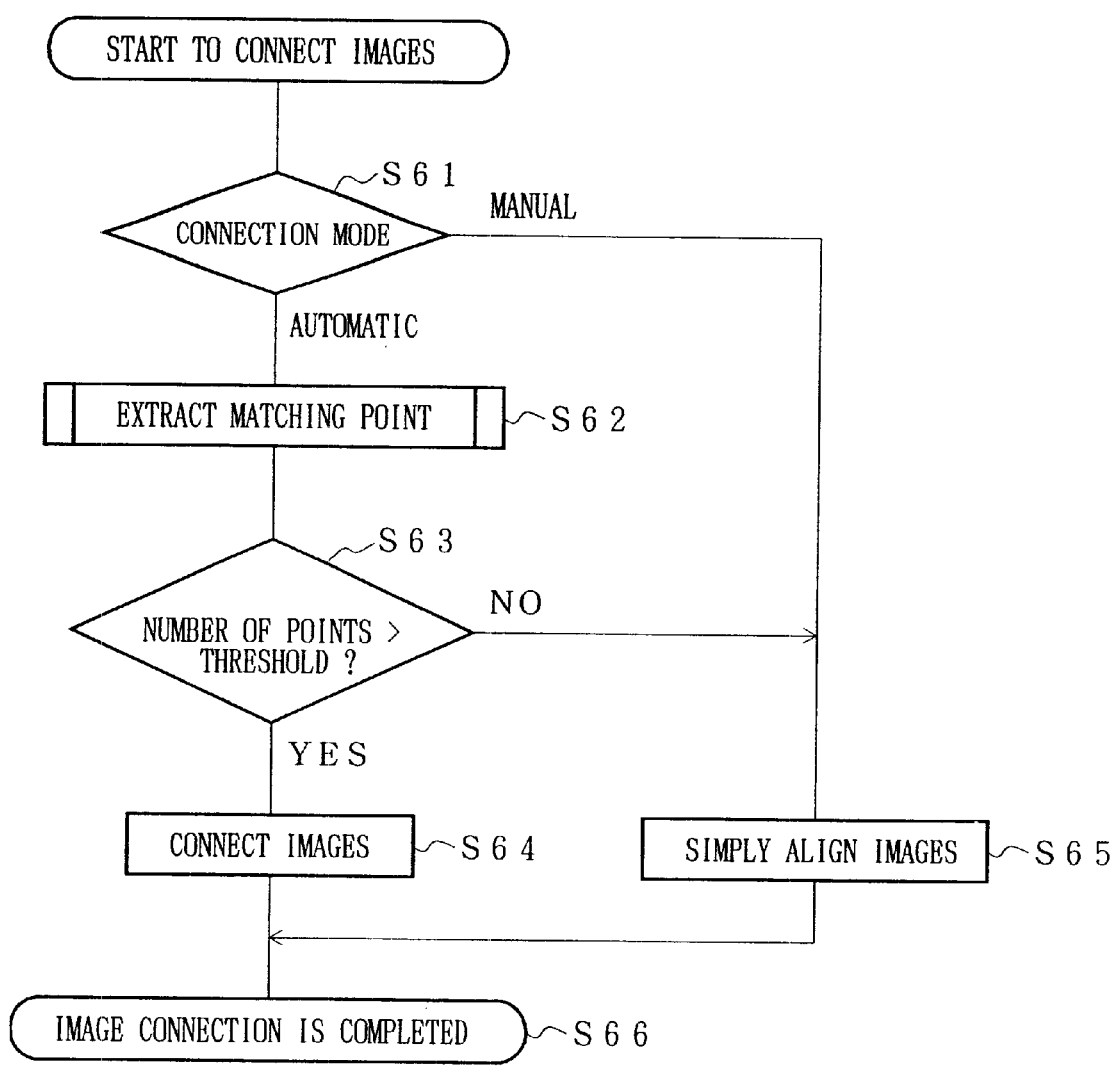
FIG. 15 is a flowchart detailing another connection processing by the above image processing device.

Alternatively, the processing as shown in FIG. 15 may be conducted. That is, the image processing device is furnished with a manual connection mode and an automatic connection mode. In the former, a plurality of input images are outputted successively without being overlapped after the predetermined image processing, and in the latter, the pattern matching processing is conducted, so that the overlapping image areas of a plurality of input images used as the matching images and reference images are extracted. When the automatic connection mode is selected, only when the number of rectangles subject to the matching point extraction processing reaches or exceeds a predetermined value, a plurality of input images are connected at the extracted matching points, and the resulting connected image is outputted (S61 through S64). On the other hand, when the manual connecting mode is selected, or when the automatic connecting mode is selected and the number of the rectangles subjected to the matching point extraction processing is less than the predetermined value, the input images are outputted successively without being overlapped (S65).

Embodiment 3

Figure 16:
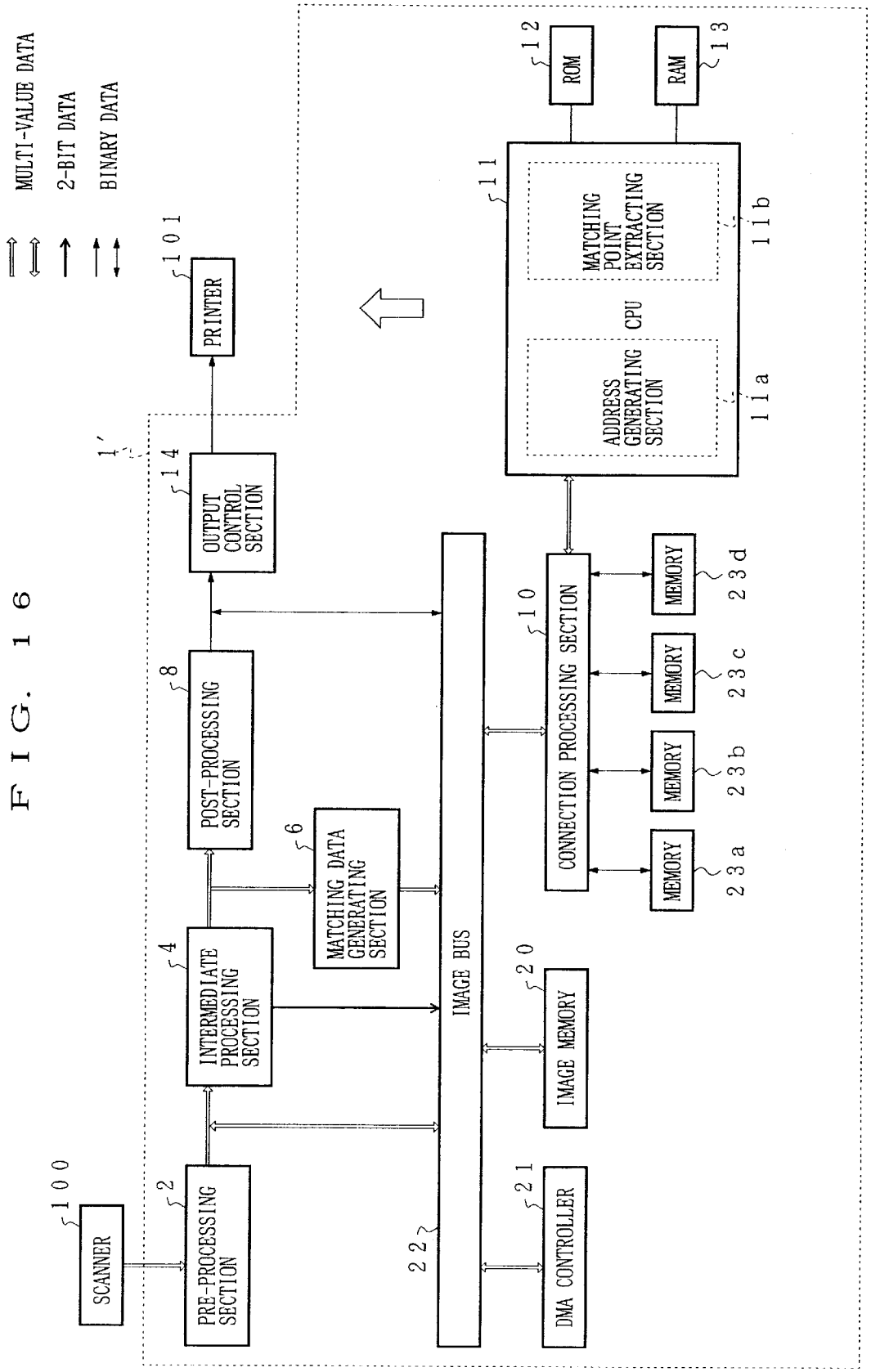
FIG. 16 is a block diagram depicting an arrangement of an image processing device of a further example embodiment.

FIG. 16 is a view depicting an arrangement of an image processing device in accordance with still another embodiment of the present invention.

An image processing device 1' of the present embodiment is identical with the image processing device 1 of FIG. 1 except that the page memory 3, identification data memory 5, matching data memory 7, and composition memory 9 are replaced by an image memory 20.

The image memory 20 is connected to the pre-processing section 2, intermediate processing section 4, matching data generating section 6, post-processing section 8, connection processing section 10, and output control section 14 through an image bus 22. The image bus 22 is connected to a DMA (Direct Memory Access) controller 21 which controls DMA data transfer among the devices connected to the image bus 22.

Also, the connection processing section 10 is provided with memories 23a through 23d to store the image data temporarily during the connection processing. The memory (second storage means) 23a stores the matching data of the matching image reduced to the reducing ratio for each hierarchy to be used in the pattern matching processing, and the matching data (multi-bit) for one pixel are stored in one address. The memory (first storage means) 23b stores the matching data of the reference image reduced to the reducing ratio for each hierarchy to be used in the pattern matching processing, and the matching data (multi-bit) for one pixel are stored in one address. The memory 23c stores the image composition data of the matching image, and the pixel data (1-bit) for one pixel are stored in one address. The memory 23d stores the composition image data of the reference image, and the pixel data (1-bit) for one pixel are stored in one address.

The pre-processing section 2 of the above-arranged image processing device 1' applies the pre-processing, such as generation of monochrome reference data, gamma correction, and shading correction, to the multi-value image data inputted from the scanner 100. The 8-bit image data for each pixel outputted from the pre-processing section 2 are transferred to the image memory 20 through the DMA controller 21 in such a manner that image data of four pixels are stored in one address. The image data stored in the image memory 20 are transferred to the intermediate processing section 4 through the DMA controller 21.

The intermediate processing section 4 applies matrix processing to the image data by means of consecutive parallel-to-serial conversion, and classifies the pixel at the center of each matrix into the character, shadow, picture, or background region based on the data relating to the number of pixel edges, the number of pixels having the highest and lowest density, run-length of the pixels having the highest and lowest density, and a distance between the pixels having the highest and lowest density in the matrix. Then, the intermediate processing section 4 stores the identification data representing the region of each pixel into the image memory 20. The intermediate processing section 4 also applies the filtering processing to the data of each pixel based on the identification data, so that the data are reduced or increased to the output size. The image data processed by the intermediate processing section 4 are inputted into the matching data generating section 6.

The matching data generating section 6 applies the matrix processing to the multi-value image data of the matching image which have been processed by the intermediate processing section 4, and generates the matching data using a difference between the largest and smallest values of density or luminance of the pixels within the matrix. The matching data generated by the matching data generating section 6 comprise 8 bits for each pixel, and are stored into the image memory 20 through the DMA controller 21 in such a manner that the matching data of four pixels are stored into one address.

Figure 17:
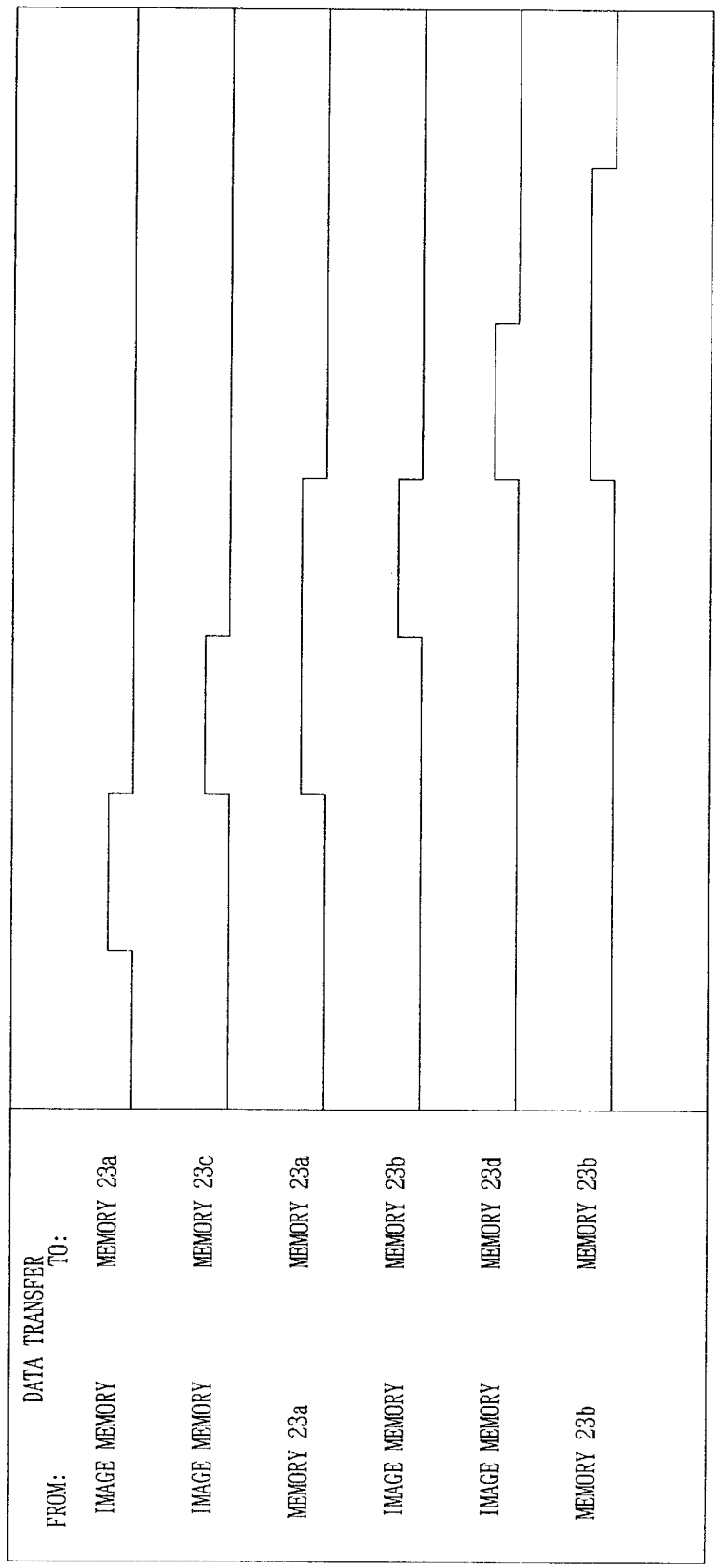
FIG. 17 is a timing chart showing data processing timing by the image processing device of FIG. 16.

The connection processing section 10 reads out the stored data from the image memory 20 at predetermined timing during the pattern matching processing and connection processing, and stores the same into the memories 23a through 23d after predetermined processing. For example, the connection processing section 10 stores the data into the memories 23a through 23d at the timing shown in FIG. 17.

To be more specific, the matching data of the matching image stored in the image memory 20 are transferred to the connection processing section 10 through the DMA controller 21 and subjected to the parallel-to-serial conversion, after which the resulting data are stored into the memory 23a. Then, the composition image data of the matching image stored in the image memory 20 are transferred to the connection processing section 10 through the DMA controller 21 and subjected to the parallel-to-serial conversion, after which the resulting data are successively stored into the memory 23c. Meanwhile, the connection processing section 10 reads out the matching data of the matching image from the memory 23a and generates the matching data reduced to the reducing ratios for all the hierarchies, and stores back the resulting data into the memory 23a.

At the timing at which the composition image data of the matching image have been stored into the memory 23c, the matching data of the reference image stored in the image memory 20 are transferred to the connection processing section 10 through the DMA controller 21 and subjected to the parallel-to-serial conversion, after which the resulting data are stored into the memory 23b. Then, the composition image data of the reference image stored in the image memory 20 are transferred to the connection processing section 10 through the DMA controller 21 and subjected to the parallel-to-serial conversion, after which the resulting data are successively stored into the memory 23d. Meanwhile, the connection processing section 10 reads out the matching data of the reference image from the memory 23b, generates the matching data reduced to the reducing ratios for all the hierarchies, and stores back the same to the memory 23b.

FIG. 18 is a view showing the data reading timing during the pattern matching processing by the connection processing section in the image processing device of the present embodiment. FIG. 19 is a view showing the data reading timing during the pattern matching processing by the connection processing section in the image processing device of FIG. 1.

In case of the image processing device 1 of FIG. 1, the matching data of the matching image and the matching data of the reference image are stored into a single storage device, that is, the matching data memory 7. Hence, as shown in FIG. 19, the connection processing section 10 has to read out the matching data of the matching image and the matching data of the reference image sequentially before it starts the pattern matching processing for each hierarchy.

In contrast, the connection processing section 10 of the image processing device 1' of the present embodiment reads out the matching data of the matching image and the matching data of the reference image respectively from the memories 23a and 23b at the timing shown in FIG. 18. In other words, the connection processing section 10 reads out the matching data of the matching image for the hierarchy to be processed from the memory 23a, and simultaneously reads out the matching data of the reference image for the corresponding hierarchy from the memory 23b. Consequently, compared with the image processing device 1 of FIG. 1, the image processing device 1' of the present embodiment can speed up the pattern matching processing.

Like its counterpart of FIG. 1, the image processing device 1' of the present embodiment connects the matching image and reference image by means of the connection processing section 10 based on the address data supplied from the address generating section 11a of the CPU 11.

The connection processing section 10 reads out the image data of the reference image from the memory 23d based on the address data supplied from the address generating section 11a, and writes the same immediately into the memory 23c, whereby the matching image and reference image are connected to each other. Upon completion of the connection processing, the connection processing section 10 reads out the image data stored in the memory 23c as the result of the connection processing, and stores the same into the image memory 20 through the DMA controller 21 by allocating the image data of 16 pixels to one address.

The image data stored in the image memory 20 as the result of the connection processing are transferred to the output control section 14 through the DMA controller 21, and outputted to the printer 101 therefrom.

As has been discussed, in the image processing device 1' of the present embodiment, the image memory 20 is connected to each device through the image bus 22, the resulting connected image data can be transferred to each device. Also, for example, the connected image data stored in the image memory 20 can be outputted to an external device, such as a personal computer, through a SCSI bus.

The above embodiments described the cases where two input images are connected to each other. It should be appreciated that, however, more than two input images can be also connected by the same procedure. In this case, the image processing devices may be arranged in such a manner that the number of the input images to be connected can be entered, so that the image processing devices selectively conduct adequate procedure for the entered number of input images.

Also, color input images can be connected in the same manners as those of the above-described embodiments by using a parameter of one color or one color space. In this case, if multi-value image data having multi-value data for each color are used as the composition image data, a color image with grey levels can be outputted.

The image processing device of the present invention may be arranged in such a manner as to conduct the following:
matching data generation processing to generate matching data, which shows the characteristics of each pixel, by using multi-image data for each of a plurality of input images;
region classification processing to classify each pixel in each input image into any of a plurality of regions using the multi-value image data;
pattern matching processing to conduct binary conversion to convert the multi-value image data into binary image data, and to extract the matching portions of the input images based on the identification data and matching data; and
connection processing to connect the binary image data of the input images in such a manner that the matching portions overlap, and to output the resulting data.

According to the above arrangement, the matching data showing the characteristics of each pixel are generated by using the multi-value image data of the input images. Then, each pixel is classified into one of the regions and the identification data are appended to each pixel. Subsequently, matching portions of the input images are extracted based on the identification data and matching data, and the binary image data of the input images are connected in such a manner that the extracted matching portions overlap.

Hence, the pattern matching processing is conducted adequately depending on the kind of region to which each pixel belongs, and the matching portions of the input images can be extracted based on such pattern matching processing by using the detailed matching data of each pixel generated from the multi-value image data and the identification data of the region into which the pixel is classified in a reliable manner based on the multi-value image data. Consequently, a plurality of input images can be connected accurately to restore a single image whether the input images belong to any of the pre-defined regions including the character, shadow, picture, and background regions, for example.

Also, the image processing device may be arranged to conduct the matching data generation processing in such a manner that a plurality of matrixes of a predetermined size are provided within the multi-value image data in such a manner that each pixel is positioned at the center of each matrix, so that the matching data of a pixel positioned at the center of the matrix are generated based on the multi-value data of a plurality of pixels contained in the matrix.

According to the above arrangement, the matching data of each pixel are generated for the pattern matching processing from the multi-value data of a plurality of pixels contained in the matrix of a predetermined size having the pixel at the center. Thus, the matching data generated in this manner are detailed and accurate by reflecting the characteristics of a plurality of pixels surrounding each pixel, thereby making it possible to improve the accuracy of the pattern matching processing.

The image processing device may be arranged to conduct the matching data generation processing in such a manner that the matching data of each pixel are generated for a plurality of reduced images obtained by reducing the multi-value image data of the input images to a plurality of reducing ratios, and to conduct the pattern matching processing in such a manner that the matching portions are extracted from the reduced images in increasing order of reducing ratios.

According to the above arrangement, matching data of each pixel are generated for each of a plurality of reduced images obtained by reducing the input images in the form of multi-value data to a plurality of reducing ratios, and the matching portions of the input images are extracted based on the matching data of the reduced images in increasing order of reducing ratios. When the input image is reduced to a plurality of reducing ratios, the number of pixels contained in the image decreases as does the reducing ratio, thereby cutting a time required for the pattern matching processing shorter. Conversely, the number of pixels contained in the image increases as does the reducing ratio, thereby improving the accuracy of the pattern matching. Thus, by conducting the pattern matching from the image having the smallest reducing ratio and least number of pixels, the pattern matching is conducted with the image having the least number of pixels and broadest area first, and thence the area of the pattern matching is gradually reduced while the number of pixels are increased. Consequently, the pattern matching can be conducted faster at higher accuracy.

Also, the image processing device may be arranged to conduct the pattern matching processing which includes:

processing to determine a kind of region of each image section provided in one of the input images (first input image) based on the identification data of the pixels contained in the image section; and processing to extract a matching section of the other input image (second input image) by adequate processing depending on the kind of region to which the image section belongs.

According to the above arrangement, the first input image to be subjected to the pattern matching processing is divided into a plurality of image sections, and the matching sections of the second input image are extracted by adequate processing which varies depending on the region to which the image section belongs. Hence, a plurality of matching portions are extracted from a plurality of input images, and as a consequence, not only the accuracy of the pattern matching is improved, but also the processing means can be downsized because a volume of data processed at a time can be reduced.

The image processing device may be arranged to conduct the pattern matching processing which includes:

processing to extract a matching section of the second input image for each of a plurality of image sections obtained by dividing the first input image;

processing to extract a matching point from the matching section of the second input image, which correspond to pixel at a specific position in each image section of the first input image, and the image processing device may be further arranged to conduct the connection processing in such a manner that the pixel at the specific position in each image section of the first input image matches with the matching point of the second input image.

According to the above arrangement, the first input image subjected to the pattern matching is divided into a plurality of image sections, and the matching sections which match with the image sections are extracted from the second input image. Then, the matching points which correspond to the pixels at the specific position in the image sections of the first input image are extracted. Accordingly, the input image are connected to each other in such a manner that the pixel at the specific position in the image section of the first input image matches with the matching point of the second input image. Consequently, a plurality of input images are connected by using a plurality of matching points as references, thereby making it possible to improve the accuracy of the connection processing.

Also, the image processing device may be arranged to conduct the pattern matching processing which includes:

processing to judge a matching degree of each image section of the first input image with the matching section of the second input image based on a comparison result of the matching data, and subsequently determines the matching points by selecting one of the followings:

(A) by using a correlation of the pixel at said specific position in each image section with respect to the matching section; and (B) by computing the matching point from positions of the matching points which have been determined for other matching sections.

According to the above arrangement, the matching points are extracted from the matching sections depending on a matching degree of each image section of the first input image which is subjected to the pattern matching processing and the matching section of the second input image by one of the following: a correlation of the second input image with respect to the pixel at the specific position of each image section; and the position of the matching points determined by the other matching sections. Thus, for the matching sections having a high matching degree with the image sections of the first input image, the matching points are readily determined based on the correlation of the second input image with respect to the pixel at the specific position of each image section, and for those having a low matching degree, the matching points are determined accurately based on the positions of the matching points which have been determined.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing device comprising:

matching data generating means for generating matching data for each pixel in each of a plurality of input images by using multi-value image data thereof, said matching data representing characteristics of each pixel;

region classifying means for classifying each pixel into one of a plurality of regions, which have been defined in advance based on kinds of images, by using the multi-value image data, said region classifying means also appending identification data exhibiting a result of classification to data of each pixel;

binary converting means for converting the multi-value image data processed by said region classifying means into binary image data;

pattern matching processing means for extracting a matching portion from data of each input image processed by said binary conversion means based on said identification data and matching data; and connection processing means for connecting the binary image data of each input image in such a manner that said matching portions extracted by said pattern matching processing means overlap.

2. The image processing device of claim 1, wherein said matching data generating means provides matrixes of a predetermined size within the multi-value image data in such a manner that each pixel is positioned at a center of each matrix, and generates the matching data of the pixel at the center based on multi-value data of a plurality of pixels contained in the matrix.

3. The image processing device of claim 1, wherein said pattern matching processing means generates a plurality kinds of reduced image data by reducing the matching data generated by said matching data generating means to a plurality of reducing ratios, and extracts the matching portions from the plurality of input images using the reduced image data in increasing order of reducing ratios.

4. The image processing device of claim 3, wherein said pattern matching processing means generates the plurality kinds of the reduced image data by averaging the matching data of a plurality of neighboring pixels.

5. The image processing device of claim 1, wherein:

at least a background image defined as a background region is included in the regions into which each pixel is classified by said region classifying means; and said pattern matching processing means omits the pixels classified into the background region from processing.

6. The image processing means of claim 1, wherein said pattern matching processing means provides a plurality of image sections, each composed of a plurality of pixels, within a first input image to be connected to a second input image among said plurality of input images;

determines a kind of region to which each image section belongs based on the identification data of the pixels contained in the image section; and extracts said matching portion from said second input image for each image section through processing which varies according to the kinds of regions.

7. The image processing device of claim 6, wherein:

at least a character region, a shadow region, and a picture region are included in the regions into which each pixel is classified by said region classifying means; and when the image section provided in said first input image is classified into one of the shadow region and picture region, said pattern matching processing means provides said second input image with an image section to extract said matching portions, said image section is smaller than an image section provided when the image section provided in said first input image is classified into the character region.

8. The image processing device of claim 1, wherein said pattern matching processing means provides a plurality of image sections, each composed of a plurality of pixels, within a first input image to be connected to a second input image among said plurality of input images, and extracts a matching section for each image section in said second input image, and provides a matching point in each matching section in said second input image, said matching point corresponding to a pixel at a specific position within the image section in said first input image, and wherein said connection processing means connects said first input image and said second input image by matching the pixel at said specific position in the image section of said first input image with the matching point in the matching section of said second input image.

9. The image processing device of claim 8, wherein said pattern matching processing means judges a matching degree of each image section in said first input image with the matching section of said second input image based on a comparison result of the matching data, and subsequently determines the matching point by selecting one of the followings:

(A) by using a correlation of the pixel at said specific position in each image section with respect to the matching section; and (B) by computing the matching point from positions of the matching points which have been determined for other matching sections.

10. The image processing device of claim 1, further comprising:

first storage means for storing the matching data of one of the two input images to be connected each other, which are used for the pattern matching processing by said pattern matching processing means; and second storage means for storing the matching data of the other image, which are used for the pattern matching processing by said pattern matching processing means.

\* \* \* \* \*